United States Patent
Campbell et al.

(10) Patent No.: US 7,926,025 B2
(45) Date of Patent: Apr. 12, 2011

(54) SYMBOLIC PROGRAM MODEL COMPOSITIONS

(75) Inventors: Colin L. Campbell, Seattle, WA (US); Margus Veanes, Bellevue, WA (US); Nicolas Kicillof, Buenos Aires (AR); Nikolai Tillmann, Redmond, WA (US); Wolfgang Grieskamp, Redmond, WA (US); Wolfram Schulte, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1504 days.

(21) Appl. No.: 11/322,781

(22) Filed: Dec. 30, 2005

(65) Prior Publication Data

US 2007/0168927 A1 Jul. 19, 2007

(51) Int. Cl.
G06F 9/44 (2006.01)

(52) U.S. Cl. .................. 717/104; 717/124; 717/132

(58) Field of Classification Search .................. None
See application file for complete search history.

(56) References Cited

U.S. PATENT DOCUMENTS

| | | | |
|---|---|---|---|
| 7,346,486 B2 * | 3/2008 | Ivancic et al. ............... | 703/22 |
| 7,711,525 B2 * | 5/2010 | Ganai et al. ................. | 703/2 |
| 2003/0115037 A1 * | 6/2003 | Sumida ...................... | 703/22 |
| 2005/0192789 A1 * | 9/2005 | Yang .......................... | 703/22 |
| 2005/0223353 A1 * | 10/2005 | Keidar-Barner et al. ..... | 717/104 |
| 2006/0010428 A1 * | 1/2006 | Rushby et al. .............. | 717/124 |
| 2006/0156261 A1 * | 7/2006 | Farkash et al. ............. | 716/5 |
| 2006/0218534 A1 * | 9/2006 | Kahlon et al. .............. | 717/124 |
| 2007/0143742 A1 * | 6/2007 | Kahlon et al. .............. | 717/124 |

OTHER PUBLICATIONS

Bultan et al., "Composite model-checking: verification with type-specific symbolic representations," ACM, 2000.*
Artho et al., "Automated Testing using Symbolic Model Checking and Temporal Monitoring," Mar. 14, 2004.*
Larsen et al., "Compositional and symbolic model-checking of real-time systems," ACM, 1996.*
Iyer, "Efficient and Effective Symbolic Model Checking," Oct. 26, 2003.*
Alfonso et al., "Visual timed event scenarios," *ICSE: Proceedings 26th International Conference on Software Engineering*, pp. 168-177, IEEE Computer Society, 2004.
Alur et al., "Alternating refinement relations," *Proceedings of the Ninth International Conference on Concurrency Theory (CONCUR '98)*, vol. 1466 of LNCS, pp. 163-178, 1998.
Barnett et al., "Towards a tool environment for model-based testing with AsmL," Petrenko and Ulrich, eds., *Formal Approaches to Software Testing, FATES 2003*, vol. 2931 of *LNCS*, Springer, pp. 264-280, 2003.
Campbell et al., "Model-based testing of object-oriented reactive systems with Spec Explorer," *Technical Report MSR-TR-2005-59*, Microsoft Research, submitted, 2005.
Clarke et al., "Model Checking," *MIT Press*, 1999.
Clarke et al., "Model checking," Chapter 21, *MIT Press*, 1999, pp. 1369-1519.

(Continued)

*Primary Examiner* — Insun Kang
(74) *Attorney, Agent, or Firm* — Klarquist Sparkman, LLP

(57) ABSTRACT

A model composition environment can allow for description of fill or partial symbolic system behavior, as well as the combination of models of specific features into compound models. Compositional operators can include intersection, concatenation, substitution, alternating refinement, as well as a set of regular expression-like operators. Models called "action machines" can represent object-oriented, reactive programs, and an action machine may be composed with another action machine using a compositional operator. This can allow for testing of particular scenarios or behaviors.

14 Claims, 8 Drawing Sheets

OTHER PUBLICATIONS de Alfaro "Game models for open systems," N. Dershowitz, ed., *Verification: Theory and Practice: Essays Dedicated to Zohar Manna on the Occasion of His 64th Birthday*, vol. 2772 of *LNCS*, Springer, pp. 269-289, 2004.

de Alfaro et al., "Interface automata," *Proceedings of the 8th European Software Engineering Conference and the 9th ACM SIGSOFT Symposium on the Foundations of Software Engineering (ESEC/FSE)*, pp. 109-120, ACM, 2001.

Diijkstra, "A Discipline of Programming," *Prentice-Hall*, 1976.

Fernandez et al., "An experiment in automatic generation of test suites for protocols with verification technology," *Science of Computer Programming—Special Issue on COST247, Verification and Validation Methods for Formal Descriptions* 29(1-2):123-146, 1997.

Frantzen et al., "Test generation based on symbolic specifications," J. Grabowski and B. Nielsen, eds., *Proceedings of the Workshop on Formal Approaches to Software Testing (FATES 2004)*, pp. 3-17, Linz, Austria, Sep. 2004, to appear in *LNCS*.

Georg et al, "Composing aspect models," in F. Akkawi et al., ed., *The 4th AOSD Modeling With UML Workshop*, 2003.

Gray et al., "Handling crosscutting constraints in domain-specific modeling," *Commun. ACM* 44(10):87-93, 2001.

Grieskamp et al., "Action machines—towards a framework for model composition, exploration and conformance testing based on symbolic computation," *Technical Report MSR-TR-2005-60*, Microsoft Research, May 2005, accepted for publication at QSIC'05.

Grieskamp et al., "Behavioral composition in symbolic domains," *Aspect-Oriented Modeling (AOM'05)*, workshop at MoDELS 2005.

Grieskamp et al., "Generating finite state machines from abstract state machines," *ISSTA '02*, vol. 27 of *Software Engineering Notes*, pp. 112-122, ACM, 2002.

Grieskamp et al., "Instrumenting scenarios in a model-driven development environment," *Information and Software Technology*, 2004.

Grieskamp et al., "XRT-Exploring Runtime for .NET—Architecture and Applications," *SoftMC 2005: Workshop on Software Model Checking*, Electronic Notes in Theoretical Computer, Jul. 2005.

Gurevich "Evolving Algebras 1993: Lipari Guide," E. Borger, ed., *Specification and Validation Methods*, Oxford University Press, pp. 9-36, 1995.

ITU-T. Recommendation Z.120. Message Sequence Charts, *Technical Report Z-120*, International Telecommunication Union—Standardization Sector, Genève, 2000.

Khurshid et al., "Generalized symbolic execution for model checking and testing," *Proc. 9th International Conference on Tools and Algorithms for the Construction and Analysis of Systems*, pp. 553-568, 2003.

Kiczales, "Aspect-oriented programming," *ACM Comput. Surv.* 28(4es):154, 1996.

Nachmanson et al., "Optimal strategies for testing nondeterministic systems," *ISSTA '04*, vol. 29 of *Software Engineering Notes*, pp. 55-64, ACM, Jul. 2004.

Sengupta et al., "Triggered message sequence charts," *SIGSOFT Softw. Eng. Notes* 27(6):167-176, 2002.

Spec# tool, <http://research.microsoft.com/specsharp>, Mar. 2005.

Spivey, *The Z Notation: A Reference Manual*, Prentice Hall International Series in Computer Science, 2nd edition, 1992.

Tretmans et al., "TorX: Automated model based testing," *1st European Conference on Model Driven Software Engineering*, pp. 31-43, Nuremberg, Germany, Dec. 2003.

Uchitel et al., "Negative scenarios for implied scenario elicitation," *SIGSOFT '02/FSE-10: Proceedings of the 10th ACM SIGSOFT symposium on Foundations of software engineering*, pp. 109-118, ACM Press, New York, NY, USA, 2002.

\* cited by examiner let $\Gamma_0 = [\![\text{true}]\!]$
var *frontier* $= \{(\Gamma_0, s_\mathbb{M})\}$
var *explored* $= \varnothing$
var *transitions* $= \varnothing$
while *frontier* $\neq \varnothing$
    let $(\Gamma, s) \in$ *frontier*
    *frontier* $:=$ *frontier* $\setminus \{(\Gamma, s)\}$
    *explored* $:=$ *explored* $\cup \{(\Gamma, s)\}$
    foreach $\Gamma \wedge c \vdash^?_\mathbb{M} s \xrightarrow{\alpha} s'$
        *transitions* $:=$ *transitions* $\cup \{s, c, \alpha, s'\}$
        if $\neg \; \exists (\Gamma'', s'') \in$ *explored* $\mid (\Gamma'', s'') \sqsubseteq ([\![\Gamma \wedge c]\!], s')$
            *frontier* $:=$ *frontier* $\cup \{([\![\Gamma \wedge c]\!], s')\}$

Fig. 5

SYMBOLIC PROGRAM MODEL COMPOSITIONS

TECHNICAL FIELD

The technologies disclosed in this application are directed toward model-based design testing and checking. More particularly, they are directed toward model composition.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Testing plays an important role in software development, and it can be a costly part of the development process. Many different aspects may be considered when determining what features are incorporated into a piece of software, including how components interact with each other. Particularly in complicated software, components are often developed separately, and it may be difficult to recognize potential bugs that can arise when the components are combined. Model-based testing is one approach that can be used to make testing more systematic and disciplined.

SUMMARY

A model composition environment allows descriptions of full or partial symbolic system behavior, as well as the combination of models of specific features into compound models. Compositional operators can include intersection, concatenation, substitution, alternating refinement, as well as a set of regular expression-like operators. Test suites can also be derived by unfolding a compound model's behavior.

"Action machines" can provide a uniform representation of models describing object-oriented, reactive program behavior. An action machine may be composed with another action machine using various composition operators, resulting in a compound model. The compound model may represent a reduction to a particular scenario (given as one model) from a larger model (given as the other model), or it may represent the combination of two individual feature models into a larger model. It may also be analyzed by exploration through state subsumption algorithms, visualized using state graph viewing techniques, and used in a model-based testing environment for checking an implementation's conformance to the model.

In one example, a software program model is created by defining a first symbolic program model, defining a second symbolic program model, and combining the first symbolic program model with the second symbolic program model according to a set of rules. The symbolic program models may be derived from a scenario machine, a use case, a state chart, a temporal logic formula, or an actual program. The first symbolic program model can contain a first set of symbolic states associated with a first set of actions, and the second symbolic program model can contain a second set of symbolic states associated with a second set of actions. In another example, the first symbolic program model has an accepting state and the second program model has an initial state. In this case, combining the first model with the second model includes merging the accepting state of the first model with the initial state of the second model. As another example, the software program model has a behavior that is related to a control variable. The behavior exhibits a first aspect (derived from the first symbolic program model) if the control variable has a first value, and the behavior exhibits a second aspect (derived from the second symbolic program model) if the control variable has a second value. Additionally, the software program model may be a subset of the first set of symbolic states and the first set of actions. In another example, properties of the software program model may be observed using a symbolic explorer, perhaps one which uses state subsumption.

A further example involves a computer-readable medium containing instructions which can cause a computer to define a symbolic program model, define a symbolic model operator, and modify the symbolic program model according to properties of the symbolic model operator. Properties of the symbolic model operator may cause the symbolic program model to be translated according to a set of translation rules. The symbolic model operator's properties may also cause the symbolic program model to be repeated one or more times upon execution of the program model.

As another example, a system for testing programs contains a digital processor and a digital memory. The memory contains a symbolic program model, and a symbolic model operator. The processor is configured to modify the symbolic program model according to one or more properties of the symbolic model operator to produce a software program model with one or more states. In a further example, the memory can also contain a test program and an explorer. In this case, the test program is configured to examine one or more states of the software program model in conjunction with the explorer. Also, the system may contain a video rendering system configured to display one or more aspects of the symbolic program model or symbolic model operator.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 5 depicts pseudocode for one possible implementation of a subsumption explorer for action machines.

DETAILED DESCRIPTION

Action Machines

Overview

Current environments for implementing model-based testing (e.g., SpecExplorer, available from Microsoft Corp.) may allow users to: model object-oriented, reactive software; analyze the specification with model-checking techniques; and derive model-based tests. However, current technologies lack notational independence—users may wish, for example, to be able to write models using different notations and styles, perhaps using both state-machine modeling and scenario-oriented description techniques. Additionally, users may wish to be able to combine models created with different notations (e.g., combine a state machine model with a scenario that describes a test purpose). They may also wish to combine models of different features, which may have been developed separately, but can be operated together.

Action machines can provide a framework for encoding and composing behavioral models of programs, including symbolic models. Such models may describe full system behavior or aspects of system behavior representing a given concern. These models can be composed and transformed by various symbolic model operators. These operators can, for example, allow users to study a model's behavior inside a basic scenario. More specifically, operators can allow a user to isolate various aspects of a model (e.g., states associated with a particular feature) or study interactions between separately developed program features. Action machine operators may, for example, operate on two action machines described with different notational schemes. Test suites can also be constructed using action machines.

Figure 1:
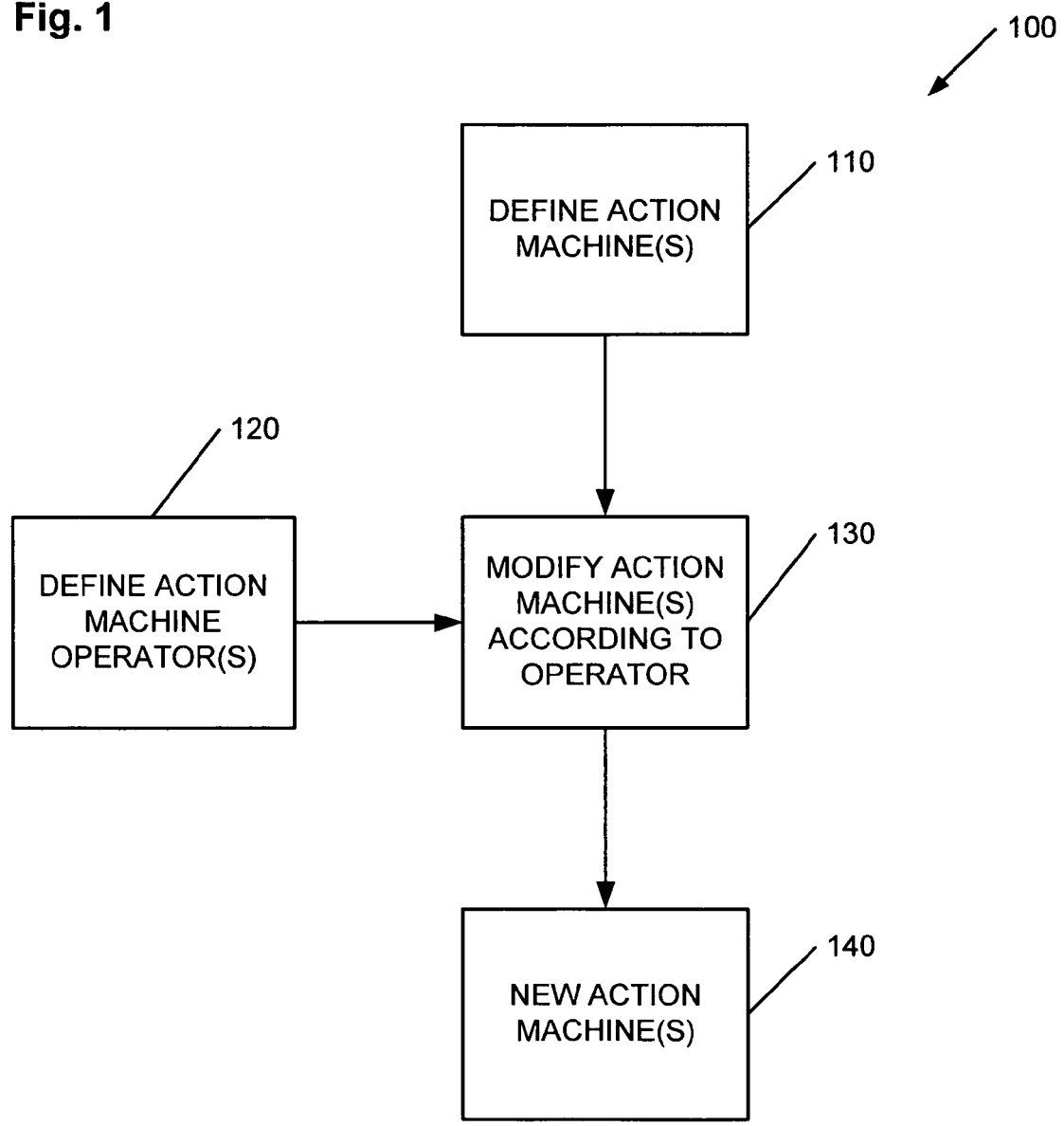
FIG. 1 depicts a method of using an action machine and an action machine operator to create a new action machine.

FIG. 1 depicts a method 100 of using an action machine and an operator to create a new action machine (e.g., a compound model). In step 110, one or more action machines are defined. In step 120, one or more action machine operators are defined, and in step 130 the action machine(s) are modified according to the operator(s). These steps lead to the production of one or more new action machines (step 140).

Action machines can result from a variety of sources. For example, they may be constructed from: an abstract state machine consisting of guarded update rules; a scenario machine; a use case; a state chart; a temporal logic formula; or an actual program. An action machine resulting from one or more such sources (rather than from a composition of other machines) is called a "basic" action machine. Action machine 200 in FIG. 2A is a basic action machine.

In a mathematical semantic domain, an action machine can be seen as a label transition system (LTS) where the labels represent actions associated with steps, and where the states represent data states. In one embodiment, the labels of the LTS have structure and are terms which may contain free logical variables. When action machines are composed, labels may be unified, and target states which may be reached by a composed transition may also be unified. The semantic domains of action machines may be, for example, traces comprising states and labels.

An action machine can be defined by an initial state from which the behavior of the machine can be transitively unfolded. States can provide an enumeration of steps, describing state transitions which the machine can make from the given state. States may be marked as accepting, i.e., as representing the end of a full run of the machine. In one embodiment, states are symbolic and comprise an explicit part and a constraint. They may incorporate concepts and features of an underlying programming model (e.g., heap, threads, and so on).

Figure 2A:
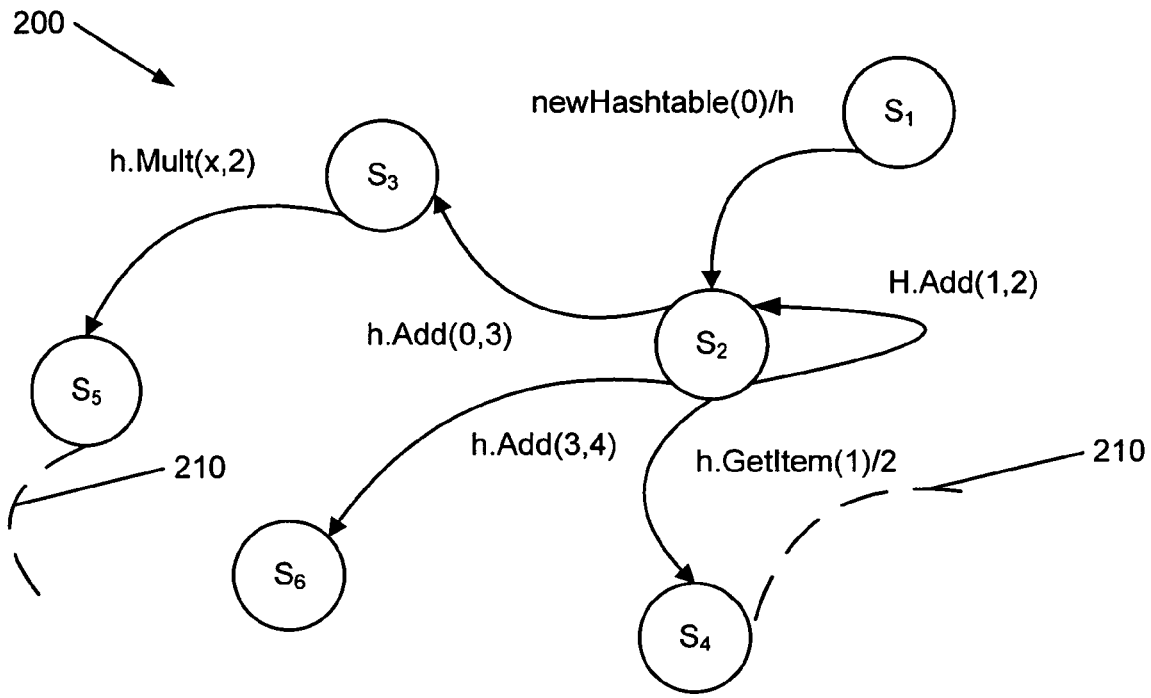
FIG. 2A depicts an example basic action machine.

In FIG. 2A, action machine 200 is comprised of states, labeled $S_i$, which are connected to other states by one or more steps. A step can comprise an action label and a target state. In some embodiments, an action label typically describes the "occurrence" of a method invocation in the modeled program, such as $o \cdot m(x_1, \ldots, x_n)/y$; where m is a static or instance method, o is the receiver object (if m is instance-based), $x_i$s are input parameters, and y is the result of the method invocation. One or more of o, x or y can be symbolic values, i.e., terms in the underlying symbolic computation domain which contain free logical variables. For example, in FIG. 2A a step from state $S_1$ to target state $S_2$ has an action label newHashtable( )/h, which refers to the method that, when invoked, results in changing from $S_1$ to $S_2$. Additional steps lead to other states which are omitted from FIG. 2A, as shown by dotted lines 210.

In some cases, states resulting from two steps of different action machines may be unified. Generally, two states can be unified if (a) the explicit state components unify pointwise in their overlapping portions, and (b) after applying the substitution resulting from the unification, the conjunction of constraints is satisfiable. The result of the unification generally comprises the explicit state parts, with overlapping parts identified, and the conjunction of the symbolic state parts. Note that this can be accomplished even if the states are expressed using different notations, allowing for notation-agnostic modeling.

Example:

Given $S_1 = (\{v_1 \mapsto 1, v_2 \mapsto x\}, x > 0)$ and $S_2 = (\{v_1 \mapsto 1, v_2 \mapsto x'\}, x' \leq 1)$, where $v_i$ are integer state variables with a given assignment and x, x' are logical variables, the unification of those states is given as $$S_1 \wedge S_2 = (\{v_1 \mapsto 1, v_2 \mapsto x\}, x > 0 \wedge x' \leq 1 \wedge x = x'),$$

which is equivalent to $(\{v_1 \mapsto 1, v_2 \mapsto 1\}, x = 1 \wedge x' = 1)$.

One tool for analyzing action machines is subsumption exploration. This is an algorithm that unfolds the behavior of an action machine, stopping at states which are subsumed by previously visited states. It can be similar to an explicit state model-checking algorithm, except that the termination criterion is not state identity but subsumption. A symbolic state subsumes another state if (a) the explicit state components unify pointwise in their overlapping portions, and (b) after applying the substitution resulting from that unification, the constraint of the subsumed state implies the constraint of the subsuming state. (It is the second point that distinguishes subsumption from unification.)

Example:

Given a set of data states that builds a complete partial order, $s_1 \rightarrow s_2$ (read "$s_1$ subsumes $s_2$") denotes the order, which is called the subsumption order. This can be though of as "$s_1$ is more general than $s_2$," or "$s_2$ contains more information (is more specific) than $s_1$."

In terms of viewing symbolic states as the set of concrete states they characterize, subsumption means that the subsumed state represents a subset of concrete states represented by the subsuming state. An action machine satisfies the condition that in a subsuming state, at least those steps are available which are available in the subsumed state. Subsumption exploration can be used for checking properties on action machines (e.g., that an intersection is not empty, or that a refinement does not contain error states), but also for graphically displaying action machines to the user. The visualization can be a state graph where transitions of subsumed states are linked to the subsuming states, representing fixed points as cycles.

Mathematical Foundations

In one embodiment, action machines assume an abstract universe of terms, $t \in T$, which capture values of the domain of modeling and implementation languages. Terms also include logical variables and term constructors for symbolic operations, e.g., the addition of two symbolic values, or the selection of a field from a symbolic object and a term which represents the state of that symbolic object. Those familiar with the art will recognize that terms may take on a number of different forms.

Terms operate within a universe of constraints, $c \in C$. The structure of constraints may also vary, including, for example, simple equality constraints or the full predicate calculus. However, in the described embodiment it is assumed that C has the tautology true and contradiction false and is closed under conjunction and implication (written as $c \wedge c'$ and $c \Rightarrow c'$, respectively), which adhere to the usual laws of Boolean algebras. To distinguish the operators of the constraint language from the operators of the meta-logic of this formalization, where necessary, the notations $[[c \wedge c']]$ and $[[c \Rightarrow c']]$ are used. The constraint universe can include a decision procedure for checking satisfiability, which should be sound (i.e., should support monotonic reasoning) but is not necessarily complete. In the present embodiment, it is assumed that the decision procedure can be invoked with SAT $c \in V$, where $V=\{$false, true, unknown$\}$ is called the verdict.

A is an abstract universe of action names, $a \in A$. Actions can be partitioned into "controlled actions" $A_C$ and "observed actions" $A_O$, such that $A = A_C \cup A_O$ and $A_C \cap A_O = \emptyset$. It is assumed that $a \in I = A \times T \times T$ is an action invocation, denoted as $a = a(t)/t'$, where t is the input parameter, and t' is the result parameter.

An action machine can be given as a tuple $$M = (S, T, s)$$

where S is a set of states, $T \subseteq S \times C \times I \times S$ is a transition relation, and $s \in S$ is the initial state. No assumptions are necessarily made about the internal structure of states. S M, T M, and s M can be written for the projections onto components of M, and $$s \xrightarrow{c \cdot a} s'$$

for a transition $(s, c, \alpha, s') \in T$. A transition can indicate that in state s the machine can make a step with invocation a to state s' provided that the constraint c is satisfied.

The transition relation can be extended to so-called "environment stepping." Generally, an environment is a constraint and is denoted with the symbol $\Gamma, \Gamma \in C$. To help deal with the incompleteness of the constraint decision procedure, two kinds of environment steps are noted, namely may steps and will steps. These are denoted by $k \in K = \{!, ?\}$, where $k=?$ represents a may-step and $k=!$ a will-step. Step kinds can have a join operator, written as $k_1 \sqcap k_2$, which results ! if $k_1 = k_2 = !$, and ? otherwise. The fact that an action machine M makes a step of the kind k in the environment $\Gamma$ can be denoted by $$\Gamma \wedge c \vdash_M^k s \xrightarrow{a} s'$$

which holds iff $$s \xrightarrow{c \cdot a} s'$$

$\in T_M$ and SAT$[[\Gamma \wedge c]] \in V$ where $V=\{$true$\}$ if $k=!$ and $V=\{$true, unknown$\}$ if $k=?$. Thus, the will-step relation is subsumed by the may-step relation.

Composing Action Machines

The shared constraint domain and environment can allow for compositions of action machines. Embodiments described below allow for the use of symbolic domains to describe behaviors and the compositions between those behaviors. Additionally, the implemented composition can be computed "on demand," thus avoiding the enumeration of composition operators which would be filtered out by the composition operator. This is expressed in the exemplary implementation later in this document.

Intersection

In one embodiment, a typical composition of action machines is the intersection (also called the "product"), written $M_1 \times M_2$ or $M_1 \otimes M_2$. Generally, two machines may step together in an intersection if (a) the action labels of the step unify, and (b) the target states unify. In other words, the product of two action machines results in an action machine which steps when both machines step with the same invocation in the same environment.

The mathematical basis for the intersection of action machines is as follows: If $M_1 \times M_2 = (S, T, s)$, then $S = S M_1 \times S M_2$, $s = (s M_1, s M_2)$ and T is a transition relation such that the following rule holds for environmental stepping:

$$P1 \frac{\Gamma \wedge c_1 \vdash_{M_1}^{k_1} s_1 \xrightarrow{a} s'_1 \quad \Gamma \wedge c_2 \vdash_{M_2}^{k_2} s_2 \xrightarrow{a} s'_2}{\Gamma \wedge c_1 \wedge c_2 \vdash_{M_1 \times M_2}^{k_1 \sqcap k_2} (s_1, s_2) \xrightarrow{a} (s'_1, s'_2)}$$

For simplification of presentation, it is assumed in this and in the following rules that invocations of composed machines match each other. Generally, unifications necessary to achieve this are represented in the constraints.

Figure 2B:
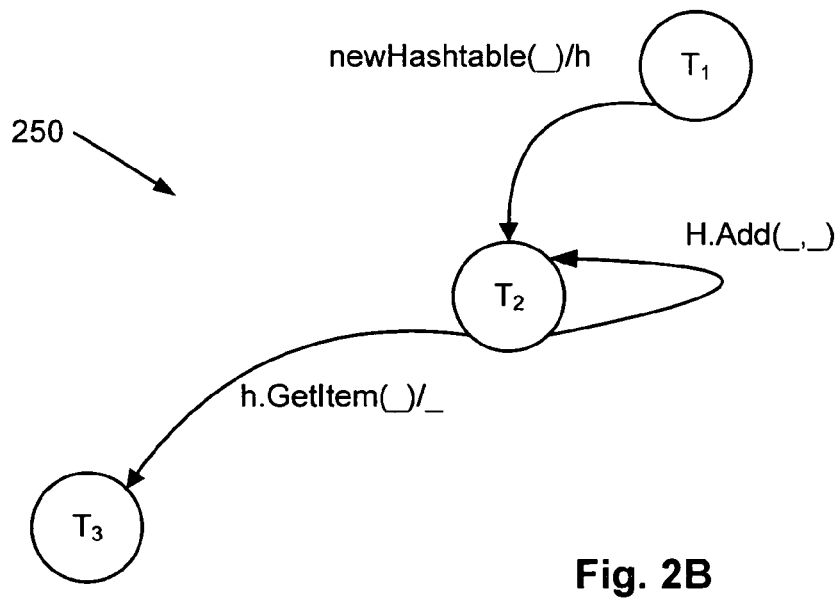
FIG. 2B depicts an example scenario action machine.
Figure 2C:
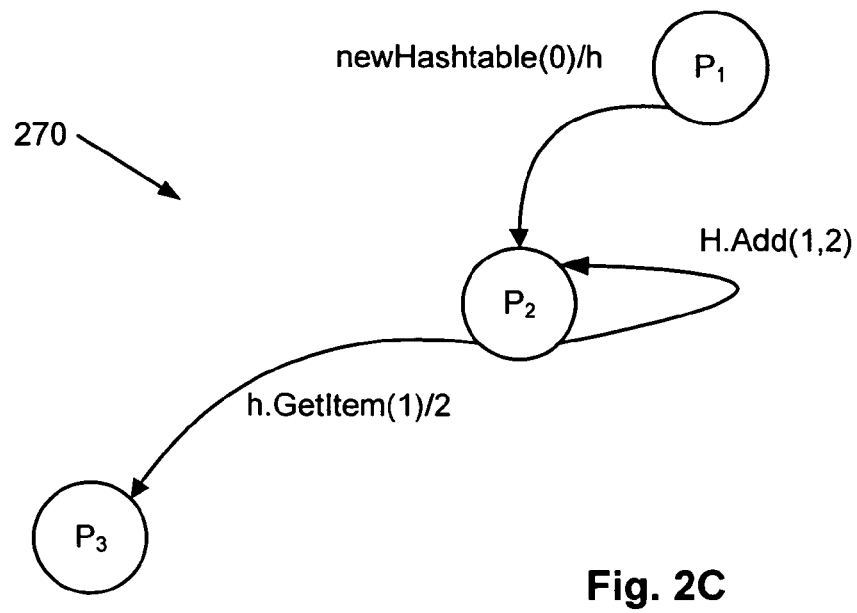
FIG. 2C depicts an action machine resulting from the intersection of two other action machines.

One possible use for intersection compositions is scenario control, where one machine represents an actual program model, and the other machine represents a scenario to which the model is to be restricted. This can allow a user to test a specific feature of a program model, for example. FIG. 2A shows an example action machine 200 of a program model. FIG. 2B shows an example scenario action machine 250, which contains only three states, labeled $T_i$. The states of action machine 250 are connected by steps, which feature method invocations as action labels. FIG. 2C shows action machine 270, which results from the intersection of action machines 200 and 250. The states of action machine 270, labeled $P_i$, and the steps that lead to them, are found in both action machines 200 and 250.

Intersection compositions can also be useful for model checking. In such an embodiment, the scenario action machine would embody the negation of the property that was to be checked (e.g., a "negative" scenario). The scenario would then be intersected with a program model action machine. The property would then be satisfied if the intersection were empty.

Concatenation

Figure 2D:
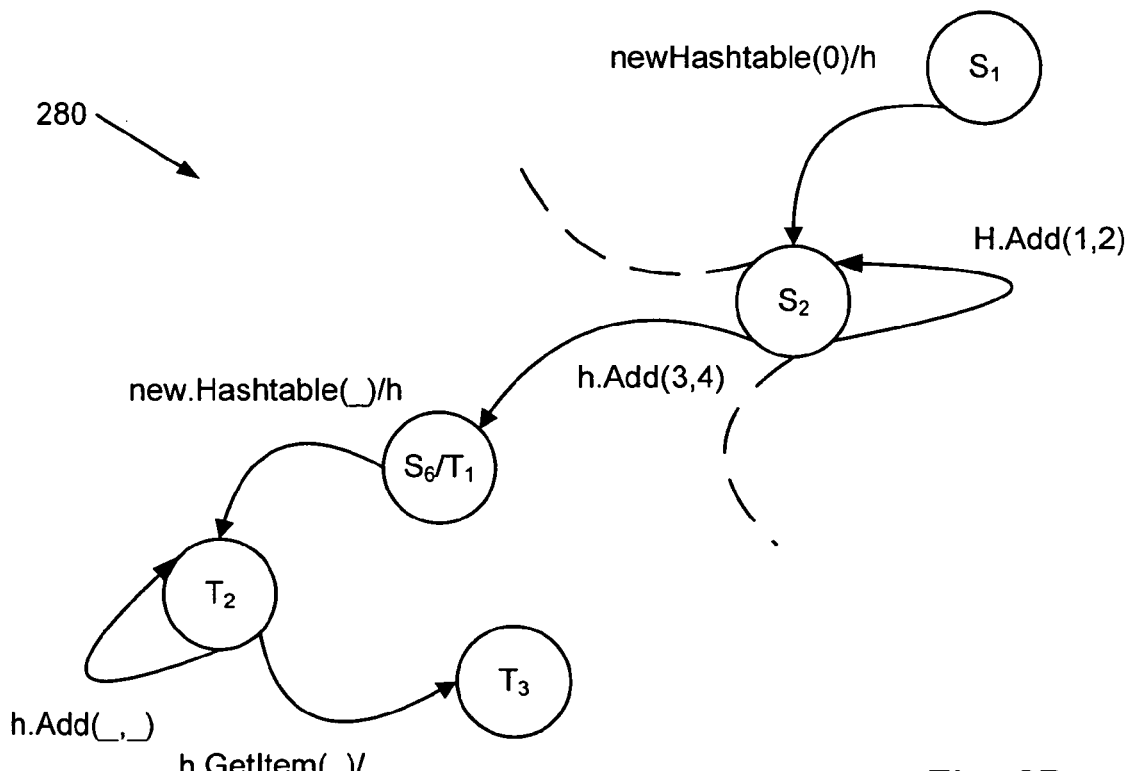
FIG. 2D depicts an action machine resulting from the concatenation of a first action machine with a second action machine.

In another embodiment, the concatenation of two action machines, written $M_1; M_2$, allows for the accepting states of the first machine to be continued with the behavior of the second machine. For example, action machine 200 of FIG. 2A features an accepting state, $S_6$. When action machine 200 is concatenated with action machine 250 of FIG. 2B, the first state of action machine 250 ($T_1$) is "merged" with $S_6$, and the action machine 280 of FIG. 2D results. (States $S_3$, $S_4$ and $S_5$ of action machine 200 are present in the concatenated action machine 280, although they have been omitted for clarity.) Concatenation may also be referred to as "sequential composition."

In some applications, concatenation can be used to describe various "phases" of a system, e.g., an initialization phase, an operation phase, and a shutdown phase. For the model-based testing context, phases like initialization and shutdown can often be described in a scenario style, whereas phases like operation can be described by state machines. This is because, in a testing setting, initialization and shutdown phases are usually introduced only in order to reach a certain state of the system, regardless of the ways in which this state can be reached; whereas in the operation phase full system behavior may need to be modeled.

In one embodiment, a construction that can be defined and implemented together with the composition operators is the universal machine, represented notationally as " . . . ". This action machine can exhibit all possible behaviors, i.e., an arbitrary number of steps of all possible actions.

Concatenation and the universal machine give rise to a derived operator, namely precedence, written $M_1 ! M_2$, which is defined as $M_1; \ldots; M_2$. Precedence can exhibit the behavior of $M_1$, then an arbitrary (but finite) number of steps, then the behavior of $M_2$.

Repetition

In yet another embodiment, M* denotes the repetition (or "one-or-more" composition) of an action machine M. In this operation, the initial state of M is considered an accepting state, thus allowing admission of an empty behavior. Each accepting state of the original M can be recursively continued with M*, maintaining its accepting state condition. In other words, M* can describe an arbitrary number of concatenations of M. Repetition may be used, for example, to describe cyclic systems, where M is the behavior of one cycle. One embodiment also supports a non-empty repetition, denoted $M^+$. A non-empty repetition can exhibit the behavior of M one or more times, in contrast to M*, which exhibits M zero or more times.

Choice

Figure 3A:
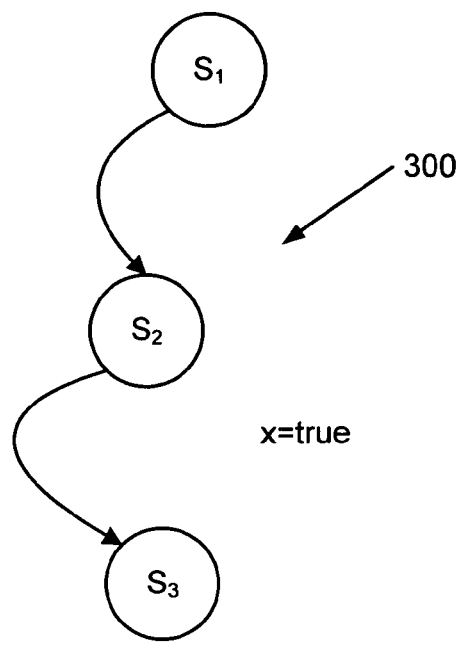
FIGS. 3A-3C depict action machines used in an example employing the choice operator.
Figure 3B:
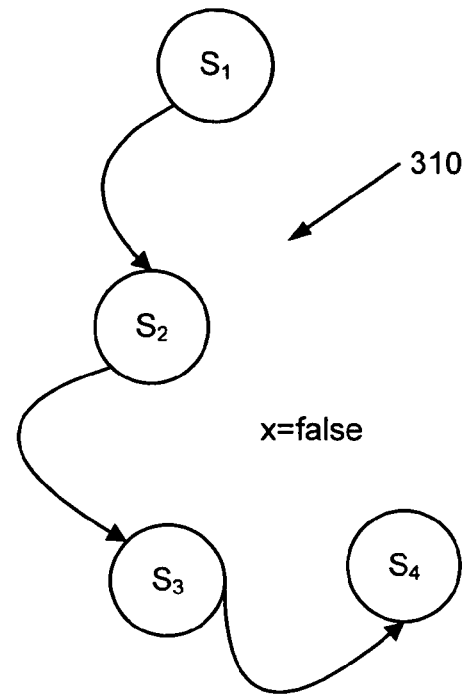
Figure 3C:
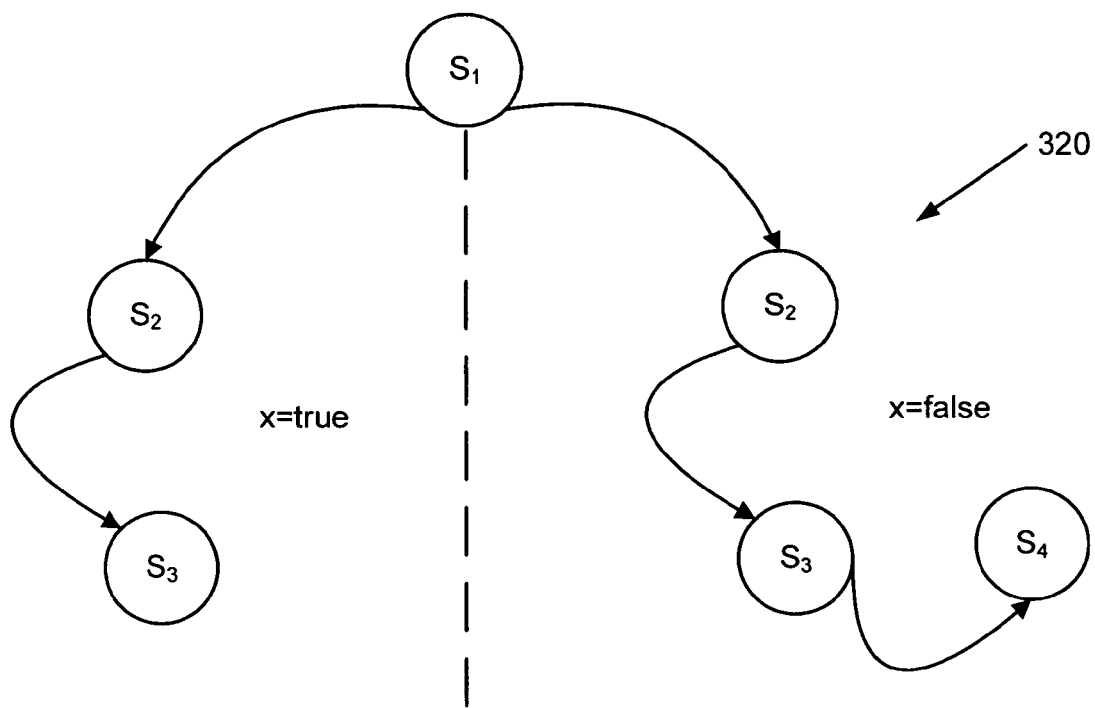

In a further embodiment, the choice operator, written $M_1 \oplus M_2$, produces an action machine that exhibits the behavior of either one operand action machine or the other. This can be used to compose, for example, alternative features which can be activated in a given state based on a control variable. By way of example, FIG. 3A depicts an action machine 300, which operates while a logical control variable x is true. FIG. 3B depicts an action machine 310 which operates when x is false. Using the choice operator on action machines 300, 310 produces action machine 320, shown in FIG. 3C.

In some embodiments, the behavior of an action machine can contain internal non-determinism, which can be important for realizing the full power of the choice operator. The choice operator may construct behaviors which start with a common prefix and diverge after a number of steps.

Choice and concatenation can give rise to a derived operator, alternation, written as $M_1 \& M_2$, and defined as $(M_1; M_2) \oplus (M_2; M_1)$. Alternation of several machines in a group may yield all possible permutations for that group of machines. This operator can, for example, allow for abstracting the order in which certain features are activated.

Another embodiment supports the optional operator, M?, which accepts both the behavior of M and the empty behavior. The optional operator can be useful to describe behaviors where a feature may or may not be invoked.

Interleaving

Another possible operator, interleaving (also called "parallel composition"), written $M_1 \| M_2$, can perform consistent interleavings of the steps of both constituting machines. In this embodiment, "consistent" means that if a step of one machine disables consecutive steps of the other, then these disabled, consecutive steps will not show in the result. Interleaving can allow for defining parallel compositions of system behavior features, which may execute independently, possibly with varying results according to the resulting order between actions.

Figure 4A:
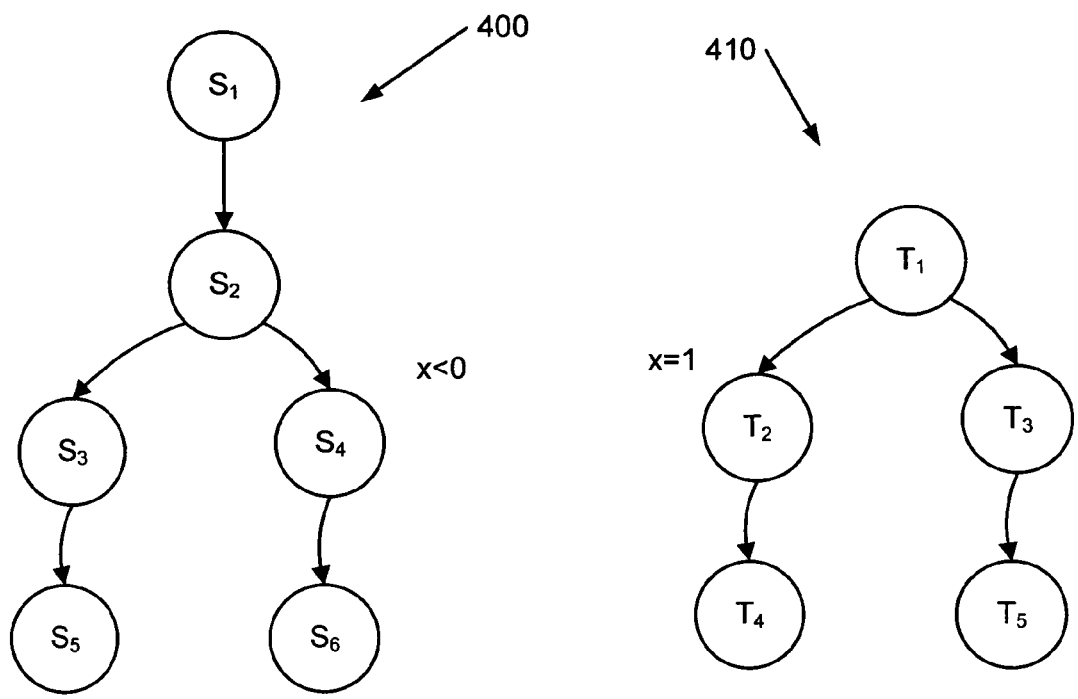
FIGS. 4A-B depict action machines used in an example employing the interleaving operator.
Figure 4B:
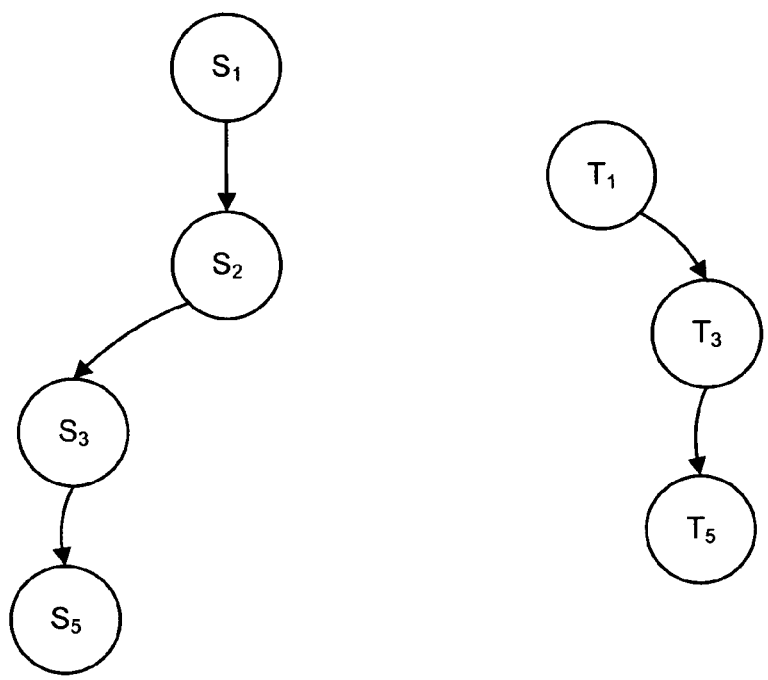

For example, FIG. 4A shows an action machine 400 with states $S_i$, along with an action machine 410 with states $T_i$. State $S_4$ requires that a variable x<0, while state $T_2$ requires x=1. Because of these differing requirements for the value of x, states $T_2$ and $S_4$ are not consistent. These states and their succeeding steps are thus excluded from the parallel composition of action machines 400, 410, shown in FIG. 4B.

An example application of interleaving is an update procedure of an operating system, which runs as a background process, but might at some point need user intervention such as closing running applications. Different interleavings of this task with the ones the user is performing might yield different results, and thus may need to be explored, tested and checked individually. This can be enabled by the interleaving operator, which generates a distinct path for each possible merger.

Translation

In a further embodiment, the translation of an action machine, written as $M_1 \uparrow \sigma$, can translate the actions of steps in machine $M_1$ according to rules described by a rule set σ. In this context, σ is essentially a model morphism, which maps types and actions into other types and actions. Some functionality that may be provided by this operation is the ability to add, erase and reorder parameters of action invocations, and to remap the invoked methods themselves.

This can be described by rewriting rules α and β, where the transition from one rule set to the other is written α⇒β. This rule set creates σ, where the sets of variables appearing in α and β are not necessarily the same. This means that in each step whose action matches α, the step of the resulting machine will perform β after applying all substitutions resulting from the match. For example, o·f(a,b)/c⇒a·g(o,d)/b is such a rewriting rule, which remaps the method f to the method g, reordering parameters o, a, and b, erasing c, and introducing a different variable d.

Another problem which can be addressed by translation is type domain morphisms, namely, replacing one type by another type and translating the instances of those types into each other. This can be useful for object-identity remappings in model-based testing.

Substitution

In another embodiment, the substitution operation, written $M_1 \leftarrow_\rho M_2$, allows for replacing steps in $M_1$ with the behavior of $M_2$ according to a gluing defined by $\rho$. $\rho$ can comprise a rewriting rule $\alpha \Rightarrow \beta$ and a set of "termination" actions $\gamma_1, \gamma_2, \ldots, \gamma_n$. Initially, the resulting machine behaves as $M_1$ while $M_2$ is suspended in its initial state. When $M_1$ can make a step $\alpha$ and $M_2$ can make the step $\beta$, resulting in a unified target state, then $M_1$ is suspended, and $M_2$ is executed. When $M_2$ reaches an accepting state via any of the termination actions $\gamma_i$, $M_1$ is resumed and $M_2$ is suspended. This behavior can be seen as if $M_1$ would "call" into the co-routine $M_2$, where communication of input and output parameters is realized via the variables shared between the actions in $\alpha$, $\beta$ and $\gamma_i$. $M_2$ can act as a co-routine in that it can maintain its own internal state between invocations from $M_1$.

The mathematical foundation of substitution is as follows. A substitution machine can be denoted as $$M_1[a_s \leftarrow_{a_b}^{a_e} M_2] = (S, T, s)$$

where $a_s$ is the substituted action of a super-machine $M_1$, and $a_b$ and $a_e$ are the beginning and ending actions of a sub-machine $M_2$, respectively. susp $\Downarrow$ (s,t) represents the suspension of the super-machine in some state s, waiting for the result t, and susp $\Uparrow$ (s) represents the suspension of the sub-machine, waiting to be called by the super-machine. The state space of the composed machine is constructed as $S = S_1 \times S_2$, where $S_1 = S M_1 \cup \{susp \Downarrow (s,t): s \in S M_1, t \in T\}$ and $S_2 = S M_2 \cup \{susp \Uparrow (s): s \in S M_2\}$.

The initial state of the action refinement machine can be given as $s = (s M_1, susp\Uparrow(s M_2))$, i.e., the sub-machine is initially suspended. The transition relation T can be implied by the following rules for environment stepping, wherein $M = M_1[a_s \leftarrow_{a_b}^{a_e} M_2]$:

$$R1 \frac{\alpha = a(t)/t_1 \quad a \neq a_s \quad \Gamma \wedge c_1 \vdash_{M_1}^k s_1 \xrightarrow{\alpha} s_1'}{\Gamma \wedge c_1 \vdash_M^k (s_1, susp\Uparrow(s_2)) \xrightarrow{\alpha} (s_1', susp\Uparrow(s_2))}$$

$$R2 \frac{\alpha_1 = a_s(t)/t_1 \quad \Gamma \wedge c_1 \vdash_{M_1}^{k_1} s_1 \xrightarrow{\alpha_1} s_1'}{\alpha_2 = a_b(t)/t_2 \quad \Gamma \wedge c_2 \vdash_{M_2}^{k_2} s_2 \xrightarrow{\alpha_2} s_2'}{\Gamma \wedge c_1 \wedge c_2 \vdash_M^{k_1 \sqcap k_2} (s_1, susp\Uparrow(s_2)) \xrightarrow{\alpha_2} (susp\Downarrow(s_1', t_1), s_2')}$$

$$R3 \frac{\alpha = a(t)/t_2 \quad a \neq a_e \quad \Gamma \wedge c_2 \vdash_{M_2}^k s_2 \xrightarrow{\alpha} s_2'}{\Gamma \wedge c_2 \vdash_M^k (susp\Downarrow(s_1, t_1), s_2) \xrightarrow{\alpha} (susp\Downarrow(s_1, t_1)s_2')}$$

$$R4 \frac{\alpha = a_e(t)/t_1 \quad \Gamma \wedge c_2 \vdash_{M_2}^k s_2 \xrightarrow{\alpha} s_2'}{\Gamma \wedge c_2 \vdash_M^k (susp\Downarrow(s_1, t_1), s_2) \xrightarrow{\alpha} (s_1, susp\Uparrow(s_2'))}$$

In this embodiment, rule R1 represents stepping of the super machine where the submachine is suspended. Rule R2 represents the call of the sub-machine from the super-machine, where the input parameters of the substituted action are passed as the input parameters of the begin action of the submachine. The result parameter of the super-machine, $t_1$, can be remembered in its suspension in the resulting state of the composed step. Rule R3 describes the case where the sub-machine performs its steps. Finally, rule R4 describes the case when the sub-machine returns; here, the result parameter of the sub-machines invocation of $a_e$ should be the stored result $t_1$ of the result of the substituted step of the super-machine.

Substitution is related to the notion of "weaving" in Aspect Oriented Programming (AOP). The quantification mechanism of the substitution operator may be limited to enumeration, or it may be extended (e.g., through the use of triggered scenarios) to allow more complete behavior specifications to identify sets of gluing points (called "pointcuts"). As in AOP's "around advices," the original step of $M_1$ can be hidden in the behavior of the resulting composed machine and substituted through steps of $M_2$. However, a step a may appear in $M_2$, such that the resulting machine appears to act as if that behavior has been added "around." This can effectively mimic the "proceed" statement in AspectJ.

As an example application, substitution can be used for hierarchical feature composition. If, for example, one model references an action representing a FileOpen dialog, and another model realizes the detailed behavior of the dialog itself, the two models can first be checked and then explored, both individually as separate units. The models can then also be glued together using substitution to further inspect them in composition. Cases like this can be notable for a co-routine-like approach, because in some embodiments the FileOpen dialog can preserve the last opened location between invocations.

Conformance Machine

A conformance machine (called an "alternating refinement machine" or an "alternating simulation" in other embodiments) can represent the behavior of two action machines. Generally, actions in $M_1$ and $M_2$ can be partitioned into "controllable" actions and "observable" actions; the former can be considered inputs and the latter outputs of $M_2$. The notions of controllable and observable can be used instead of "inputs" and "outputs" to emphasize the viewpoint of the environment (the viewpoint of a tester, for example).

In a conformance machine, the second machine can simulate the behavior of the first machine regarding controllable action invocations, and the first machine can simulate the second machine regarding observable action invocations. If the alternating simulation is not possible, this machine can step into an error state, indicating a conformance failure. The conformance machine can resemble the notion of conformance checking as found in some software tools (e.g., the Spec Explorer tool from Microsoft Corp.). This notation is closely related to that of alternating refinement as sometimes defined for interface automata. Typically, the second machine in this composition represents a program implementation. However, another view is that of building chains of conformance of multiple model machines.

The mathematical foundation of conformance is as follows. It is assumed that error denotes a distinct state for representing conformance failure. It is also assumed that $M_1 \rightsquigarrow M_2 = (S, T, s)$ denotes the conformance machine, where $S = (S M_1 \times S M_2) \cup \{error\}$, $s = (s M_1, s M_2)$, and that T is a transition relation such that the following rules hold for environment stepping (where for all rules, α=a(t)/t' and (i,j)=if a∈$A_C$ then (1,2) else (2,1)):

$$C1 \frac{\Gamma \wedge c_i \vdash_{M_i}^k s_i \xrightarrow{\alpha} s'_i \quad \Gamma \wedge c_j \vdash_{M_j}^! s_j \xrightarrow{\alpha} s'_j \quad SAT[[\Gamma \wedge c_i \Rightarrow c_j]] = true}{\Gamma \wedge c_i \vdash_{M_1 \leadsto M_2}^k (s_1, s_2) \xrightarrow{\alpha} (s'_1, s'_2)}$$

$$C2 \frac{\Gamma \wedge c_i \vdash_{M_i}^k s_i \xrightarrow{\alpha} s'_i \quad \neg \exists c_j, s'_j : (\Gamma \wedge c_j \vdash_{M_j}^! s_j \xrightarrow{\alpha} s'_j \wedge SAT[[\Gamma \wedge c_i \Rightarrow c_j]] = true)}{\Gamma \wedge c_i \vdash_{M_1 \leadsto M_2}^! (s_1, s_2) \xrightarrow{\alpha} error}$$

The machine which demands a step is called the master machine $M_i$, and the machine which should be able to simulate the master's step is called the slave machine $M_j$. Roles of master and slave can alternate depending on whether controllable or observable actions are being examined. Rule C1 describes one embodiment of a successful conformance step: if the master may or will make a step, then the slave will be able to do that step. In addition, the constraint $c_j$ of the slave machine can be implied by the environment and the constraint $c_i$ of the master. Rule C2 describes an embodiment of the failure case: if there does not exist a constraint $c_j$ with which the slave will step and which is implied by the environment and the master's constraint, the composed machine can step into the error state.

The following example may be helpful in understanding the requirement that the slave's constraint should be implied by the master's constraint.
Example:
In one embodiment, a constraint system is built from interval constraints, such that x∈l . . . u denotes that the variable x ranges between a lower bound l and an upper bound u. It is assumed that $c_i$=[[x∈1 . . . 2]], $c_j$=[[x∈1 . . . 1]] and α=a(x). It is supposed that the master may do the step $$\Gamma \wedge c_i \vdash_{M_i}^? s_i \xrightarrow{\alpha} s'_i$$

and that the slave can do only the step $$\Gamma \wedge c_j \vdash_{M_j}^! s_j \xrightarrow{\alpha} s'_j.$$

The composition of these two machines steps (via rule C2) into the error state, since $\Gamma \sqcap c_i \Rightarrow c_j$ is not satisfiable. This can be compared with the explicit expansion of the range constraint on the parameter x to the action a. $M_i$ can do controllable invocations a(1) and a(2), whereas $M_j$ can only do a(1), which is a conformance failure. This can also be compared with the product machine, $M_1 \times M_2$. In that machine, the constraints $c_i$ and $c_j$ could be conjuncted, yielding a machine which can do just the invocation a(1).

It should be noted that the above definition of conformance is conservative regarding the treatment of inconclusive solver queries. It can require that the slave machine will simulate the master machine for steps even if these steps may be only possible in the master. This reflects in the rules in the use of the will-step relation for the slave. As a result, the above embodiment can have so-called "false negatives" (that is, conformance failures which are not actually failures), but no "false positives" (that is, conformance successes which are not actually successes). Other embodiments may use less conservative definitions of conformance.

Test Suite Unfolding

In another embodiment, a test suite (e.g., a set of testing criteria) is constructed from an action machine. This can be viewed as a transformation which yields another action machine. In the present embodiment, this new action machine typically has a tree-like behavior, where a sub-tree starting at the initial state can represent one test case and can satisfy the following property: a state in the sub-tree has either (a) exactly one outgoing controllable step, or (b) any number of outgoing observable steps. The states in case (a) are "active," since they can represent the situation where a tester (a human or a program) actively makes a decision. The states in case (b) are "passive," since the tester usually waits for a reaction from the system-under-test. Thus, the signature of the action machine can be extended by two pseudo-actions to represent transitions between active and passive states: one controllable action (called "StartWait" in one embodiment) which transitions from an active state into a passive state, representing the decision of the tester to now observe outputs of the system; and one observable action (called "Timeout" or "timespan" in some embodiments) which transitions from a passive state into an active one, representing that the tester stops waiting for output.

Test suite unfolding can be done in various ways. In one embodiment, exhaustive unfolding is intended to capture all behavior of the action machine, which is finite to that end. Alternatively, random unfolding makes intelligent random choices on which paths to unfold. Other unfolding techniques use different pruning techniques, some which have been developed for software tools such Spec Explorer and other model-based testing tools. Generally, techniques can be used for online (on-the-fly) testing as well as for off-line testing. For online testing, the implementation is tested as unfolding proceeds, whereas for offline testing, a test suite is presented which represents the unfolding.

Exploring Action Machines

Action machine properties can be observed by various means. Presented here are embodiments of a class of symbolic explorers which can do exhaustive exploration using a notion of state subsumption to prune the search.

In one embodiment, M=(S, T, s) represents an action machine. State subsumption can be defined as a partial ordering on pairs of environments and states, written as $$(\Gamma_1, s_1) \sqcap (\Gamma_2, s_2),$$

which has the following properties: $SAT[[\Gamma_2 \Rightarrow \Gamma_1]]$=true; and, for all constraints $c_1$, $c_2$ and invocations α, if $$\Gamma_2 \wedge c_2 \vdash_M^k s_2 \xrightarrow{\alpha} s,$$

then $$\Gamma_1 \wedge c_1 \vdash_M^k s_1 \xrightarrow{\alpha} s.$$

Thus, if M can do a step in $\Gamma_2$ and $s_2$ then it can do the same step in $\Gamma_1$ and $s_1$.

Subsumption can be helpful for pruning exploration. For example, when an environment-state pair (Γ, s) is encountered which is subsumed by another pair which has been already explored, continued exploration of (Γ, s) is unnecessary because its outgoing transitions have already been captured.

FIG. 5 shows pseudocode implementing one possible algorithm for exploration in the presence of state subsumption. The algorithm maintains as its state a frontier of environments and states which still need to be explored. Initially, the frontier contains the environment representing the tautology constraint true along with the initial state of the action machine. The algorithm furthermore has a state variable explored which captures those environments and states which have been encountered during exploration, and a variable transitions which holds the set of transitions it has found so far.

As long as there are elements in the frontier, this algorithm continues exploration, selecting one pair of environment and state from the frontier, and removing that pair. The choice of which pair is selected governs the search strategy (depth-first, breadth-first, or some priority search), which may vary by embodiment. The algorithm then tries steps which are possible from the given environment Γ and state s. If a step is possible, then it is added to the set of "found" transitions. It is then determined whether the resulting environment and state are subsumed by any of the environments and states which have been explored so far. If that is not the case, the resulting environment ΓΓc and state s' are added to the frontier.

It can be shown that, given a conformation machine M= $M_1 \rightsquigarrow M_2$, if a subsumption explorer terminates on M, it has discovered all conformance failures. This property can allow pruning exploration of the conformance machine using subsumption without loss of precision.

Exemplary Implementation

Presented here is a pseudocode implementation of one embodiment of action machines and composition operators. Not all aspects of all embodiments discussed above are implemented below. The implementation of at least some additional aspects will be apparent to those of skill in the art.

The pseudocode below uses the executable specification language AsmL to describe the operational semantics. AsmL is a notation which is closely aligned with Microsoft®.NET connection software programming languages like C#, and supports the constructs of those languages, such as classes, interfaces and so on. In addition, it supports mathematical notations for finite sets and maps like set comprehension.

The exemplary implementation makes heavy use of one feature in AsmL (and C# 2.0) which allows describing streams (enumerations) with so-called "iterators." An iterator is a method which delivers a value of type Stream of T (IEnumerable<T> in C#) by yielding the elements of that stream step-by-step. For example, the method of Table 1 takes a stream and delivers a new stream where all odd numbers are filtered out.

TABLE 1

FilterOddNumbers(s as Stream of Integer) as Stream of Integer
   foreach i in s
     if i mod2 = 0
       yield i The yield statement marks the point where the iterator delivers the next element of the stream. At this point, the execution of the iterator method suspends and is not resumed until the next element of the stream is queried; then execution will continue until the next yield statement is reached for delivering the next element. If the execution of the methods ends, the resulting stream also ends.

A further feature of AsmL used below is that of structure types. Structures are declared in AsmL, as shown in Table 2.

TABLE 2 structure Coordinate
   xcord as Integer
   ycord as Integer

Structures behave similarly to classes and can implement interfaces, among other things. However, the difference between structures and classes (as known in C#) is that structures are immutable (the field assignments generally cannot be changed). They can also provide an implicit default constructor (Coordinate(1,2) creates a new coordinate value), and they come with a built-in structural equality, which can be applied recursively over nested structures.

Symbolic Data and State

In this embodiment, it is assumed that there is a given set of terms over some signature (see Table 3). These terms describe concrete program values (e.g., numbers, object identities, strings, etc.), logical variables (symbols), as well as operations over terms. An example term in the present embodiment could be Plus(x,1), where x is a variable, and the term represents addition of the value 1 to that variable.

TABLE 3 type TERM

There is also a function on terms which delivers the set of free variables in the term, and a function which delivers a new fresh variable which is distinct from all other variables, as shown in Table 4.

TABLE 4

FreeVariables(t as TERM) as Set of TERM
FreshVariable( ) as TERM

There is an additional function on terms named "CloneWithFreshVariables" which renames all variables occurring in a term to fresh variables not used anywhere else. There is also an overloaded version which restricts the renaming to an explicitly given set of variables. CloneWithFreshVariables and the overloaded version are shown in Table 5.

TABLE 5 type TERM
Clone WithFreshVariables(t as TERM) as TERM
Clone WithFreshVariables(t as TERM, vars as Set of TERM) as TERM It is assumed there is a set of constraints, which in this context can be formulas in some logical domain. Atomic constraints constitute equality between terms and conjunction of constraints. An example appears in Table 6.

TABLE 6 type CONSTRAINT
operator = (t1 as TERM, t2 as TERM) as CONSTRAINT
operator and (c1 as CONSTRAINT, c2 as CONSTRAINT) as CONSTRAINT Thus, for example, Plus(x,1)=y and GreaterEqual(y,1)=True is a constraint (provided Plus, GreaterEqual, and True are term operators).

It is also assumed that there is some decision procedure (perhaps an incomplete one) which can prove whether a constraint is satisfiable, meaning whether an assignment to all variables in the terms of the constraint exists such that the constraint is true. An example appears in Table 7.

TABLE 7 enum VERDICT
    IsTrue
    IsFalse
    IsInconclusive
Satisfiable(c as CONSTRAINT) as VERDICT An incomplete decision procedure may also be assumed to exist which can prove whether one constraint is subsumed by another constraint. The semantic meaning of subsumption in this case is that: Subsumes (c1,c2) is true exactly when the set of solutions to the variables shared between the constraints in c1 can be proven to be a superset or equal to the set of solutions of the shared variables in c2; it is false exactly when it can be proven that this is not the case; and it is inconclusive if the decision procedure is not able to prove any of the above. The syntax for Subsumes appears in Table 8.

TABLE 8

Subsumes(c1 as CONSTRAINT, c2 as CONSTRAINT) as VERDICT

In the present embodiment, it is also assumed that there is a given finite, fixed set of locations, which represent places where values are stored in a state (see Table 9).

TABLE 9 type LOCATION

A (symbolic) data state is defined as a pair of a total mapping from locations into terms, and a constraint. For clarity of the semantic construction, a fixed set of locations is used. (In this embodiment, if a model uses only some of those locations, the unused locations are considered to be initialized with free logical variables. In another embodiment, this is optimized by not having unused locations in the valuation map.) An example appears in Table 10.

TABLE 10 structure DATASTATE
    valuation as Map of LOCATION to TERM
    constraint as CONSTRAINT For example, DATASTATE({l1:=Plus(x,1), l2:=y}, Plus(y,1)=x) is a data state (provided the set of locations is {l1, l2}).

Data states can be associated with functions to determine a set of free variables in the valuation and the constraint, as well as functions to create a copy of a data state with fresh variables, and to create a copy of a data state and a given term (where the renaming to fresh variables will be consistently applied to the data state as well as the term). An example appears in Table 11.

TABLE 11

FreeVariables(ds as DATASTATE) as Set of TERM
CloneWithFreshVariables(ds as DATASTATE) as DATASTATE
CloneWithFreshVariables(ds as DATASTATE, t as TERM ) as (DATASTATE, TERM)

For the purpose of describing compositions on action machines, this embodiment provides two operations on data states: joining of states and state subsumption. Joining is an operation which merges two data states. It is assumed that the merging does not lead to a provable contradiction. Generally, join should be only called on data states with disjoint variables, as shown in Table 12:

TABLE 12

Join(ds1 as DATASTATE, ds2 as DATASTATE) as DATASTATE?
    require FreeVariables(ds1) * FreeVariables(ds2) = { }
    var c = ds1.constr and ds2.constr and
    foreach l in LOCATION
        c := c and (ds1.valuation(l) = ds2.valuation(l))
    if Satisfiable(c) <> VERDICT.IsFalse
        DATASTATE(ds1.valuation override ds2.valuation, c)
    else
        undef Thus the joining operation can construct a constraint which comprises the conjunction of the constraints of the joined states, plus point-wise equalities for the values in each location. If this constraint is not provably unsatisfiable, the join is defined; otherwise it is undefined. Therefore, joined states may be allowed if they are potentially feasible. Depending on the application, such states might be desired or not desired. For example, in model-checking, such states can lead to an over-approximation in the model, which is generally preferred to an under-approximation, since if no error is found in a model with over-approximation, no error in the exact model exists, either.

Subsumption checks whether one state subsumes another state. Semantically, one state subsumes another state if the set of solutions of the location valuation in the one state is a superset of the set of solutions of the location valuation in the other state. It is assumed that the set of solutions to the location valuation is determined by the terms found in a state's valuation plus its constraint. Subsumption is defined by lifting it from the given subsumption operation on constraints. To that end, a new constraint is constructed for each state which consists of the state's original constraint plus bindings of location valuations to a fresh variable per location which is shared between the states; on the such constructed constraint the decision procedure for constraint subsumption is invoked, as shown in Table 13:

TABLE 13

Subsumes(ds1 as DATASTATE, ds2 as DATASTATE) as Boolean
    require FreeVariables(ds1) * FreeVariables(ds2) = { }
    var c1 = ds1.constr
    var c2 = ds1.constr
    foreach l in LOCATION
        let v = FreshVariable( )
        c1 := c1 and (v = ds1.valuation(l))
        c2 := c2 and (v = ds2.valuation(l))
    c1, c2) = VERDICT.IsTrue As an example of state subsumption, it is assumed that there are two states ds1=DATASTATE({l1:=x, l2:=y}, x=y}) and ds2=DATASTATE({l1:=1, l2:=1}, True). The state ds1 subsumes the state ds2, since the constructed constraint, v1=x, v2=y and x=y, subsumes the constructed constraint v1=1 and v2=1. The solutions to the shared variables v1 and v2 in the first constraint are a superset of the solutions to the variables v1 and v2 in the second constraint. Unlike the joining of states, subsumption may require a conclusive positive decision. Again, the choice can depend on the application.

Operational Abstraction of Action Machines

In the present embodiment, an action machine state is given by a pair comprising a data state and a control state. The control state can be compared to a program counter in that it determines the control flow of the machine at the given state. An example appears in Table 14.

TABLE 14 structure MACHINESTATE
data as DATASTATE
control as CONTROLSTATE

An action machine can be described by the following interface, which contains a single method for enumerating the initial states. For every machine state ms in m.GetInitialStates (ds), it follows that Subsumes(ds,ms.data). Intuitively, the initialization of a machine can refine the data state (for example, by adding initializations of locations only used by that machine), but should ensure that this refinement is consistent with ds. If GetInitialStates is called with a data state for which the given machine cannot fulfill this requirement, it should deliver an empty stream, as shown in Table 15:

TABLE 15 interface MACHINE
GetInitialStates(s as DATASTATE) as Stream of MACHINESTATE
ensure forall ms in result holds
Subsumes(s,CloneWithFreshVariables(ms.data))

Subsumption on machine state is defined by subsumption on the embedded data state, and on structural equality of the control states. Other approximations for particular control state kinds may be used in place of structural equality. Structural equality can be advantageous in that it can ensure by construction that identical behavior is described by subsuming machine states, with respect to the control part. An example is shown in Table 16:

TABLE 16 structure MACHINESTATE
Subsumes(ms as MACHINESTATE)
Subsumes(data, ms.data) and control.Equals(ms.control)

Machine states provide a set of additional methods, which are delegated to the control state, and implemented according to the corresponding action machine, as shown in Table 17:

TABLE 17 structure MACHINESTATE
    Accepting( ) as Boolean    control.Accepting(data)
    Error( ) as Boolean    control.Error(data)
    Steps( ) as Stream of (TERM,    control.Steps(data)
    MACHINESTATE)
interface CONTROLSTATE
    Accepting(ds as DATASTATE) as Boolean
    Error(ds as DATASTATE) as Boolean
    Steps(ds as DATASTATE) as Stream of (TERM, MACHINESTATE)

The method CONTROLSTATE.Accepting is true for machine states which are accepting. The concept of accepting states as generally known from automata theory is used to describe valid termination states of machines.

The method CONTROLSTATE.Error is true for machine states which are in an error condition. In this embodiment, an error state is a special kind of termination state where the cause of termination is a failure in execution.

The method CONTROLSTATE.Steps can deliver the stream of steps which can be done from the given state. Thereby, a step is given by a pair of a term, representing the action label of the step, and a target machine state. The action label represents some externally visible "event" (the nature of the event is generally irrelevant for the framework of action machines). In one application of action machines for model-based testing, action labels are special terms which represent invocations of methods that are to be controlled or observed in the tested system. For example, the term $m(t_1,t_2)/t_3$ is used to represent the invocation of method m with input parameters $t_1$ and $t_2$ and output parameter $t_3$ (all of which are terms again). In other applications, action labels might represent inputs and outputs to a system, updates on global shared memory, or other globally visible events.

Basic Action Machines

As explained above, basic action machines can arise from a number of sources. For illustration purposes, two basic action machines are described here: a single step machine, which constructs a behavior which performs one step independently from the data state; and a guarded-update machine, which constructs a behavior which is determined by guarded update rules on the data state.

The single step machine can be parameterized over an action label with which it should perform its step, and a set of variables which are considered free in the action label term, as shown in Table 18:

TABLE 18 structure SingleStepMachine : MACHINE
action as TERM
freeVars as Set of TERM

The enumeration of initial states can deliver a machine state which reproduces the passed data state and a control state representing the instant before the single step has been performed:

TABLE 19 structure SingleStepMachine implements MACHINE
GetInitialStates(ds as DATASTATE) as Stream of
MACHINESTATE
yield MACHINESTATE(ds, new
SingleStepBeforeStepControl(action))

The control state, before the step has been performed, can be defined as shown in Table 20:

TABLE 20 structure SingleStepBeforeStepControl implements CONTROLSTATE
    action as TERM
    Accepting(ds as DATASTATE) as Boolean
        false // non-accepting before the step is done
    Error(ds as DATASTATE) as Boolean
        false

TABLE 20-continued

```
Steps(ds as DATASTATE)
    yield (Clone WithFreshVariables(action, freeVars),
        MACHINESTATE(ds, new AfterStepControl( )))
```

The Steps method yields a clone of the action where the given free variables are replaced with fresh variables. (Other variables may also occur in the label and are bounded by enclosing constructs which are not formalized here.)

The target machine state uses a new control for the case after the single step has been performed. This control state differs from the previous one in that the step has already been performed, and is defined as follows in Table 21:

TABLE 21

```
structure SingleStepAfterStepControl implements CONTROLSTATE
    Accepting(ds as DATASTATE) as Boolean
        true // accepting after step is done
    Error(ds as DATASTATE) as Boolean
        false
    Steps(ds as DATASTATE)
        skip // no steps possible
```

A guarded-update machine comprises a set of guarded-update rules. These rules can be written in the style of a model program, for example in the language Spec#, available from Microsoft Corp. Table 22 shows an example of such a model program in Spec#, describing an aspect of a calculator by guarded-update rules, namely the functionality of the calculator switching between scientific and non-scientific mode.

TABLE 22

```
bool Running = false;
bool Scientific = false;
void Start( )
    requires !Running;
{
    Running = true;
}
void Stop( )
    requires Running;
{
    Running = false;
}
void ToggleScientific( )
    requires Running;
{
    Scientific = !Scientific;
}
```

In this embodiment, the action machine defined by a guarded-update machine is determined solely by the data state. In each machine state, the possible steps are those for which an action's guard is true. The target step of the state results from applying the updates of the action to the initial data state. In the example above, initially only the Start method is enabled. After the calculator has been started, only the Stop and the ToggleScientific methods are enabled.

In one embodiment, an action machine is defined which encapsulates a guarded update machine. First, types are defined for representing state-dependent constraints and state-transformations. These are given by delegate (function) types as follows:

TABLE 23

```
delegate STATECONSTRAINT(ds as DATASTATE) as CONSTRAINT
delegate STATETRANSFORMER(ds as DATASTATE) as DATASTATE
```

The update rules are represented by the structure in Table 24:

TABLE 24

```
structure RULE
    action as TERM                          // the action of the rule
    guard as STATECONSTRAINT                // the guard
    update as STATETRANSFORMER              // the update
    CloneWithFreshVariables( ) as RULE      // create a copy of this rule
                                            // with fresh logic variables
```

It should be noted that the construction of the guard constraint depends on a given data state, since the guard can refer to locations in that data state, which can have different valuations in different data states. For example, in the calculator pseudocode presented above, the guards refer to the location Running, and the constraint constructed from a guard may differ from state to state.

The guarded-update action machine can be parameterized over a set of rules, together with a state-dependent constraint for the accepting state and error state condition. For example:

TABLE 25

```
structure GuardedUpdateMachine implements MACHINE
    rules as Set of RULE
    accept as STATECONSTRAINT
    error as STATECONSTRAINT
    GetInitialSteps(ds as DATASTATE) as Stream of MACHINESTATE
        yield MACHINESTATE(ds, new GuardedUpdateControl(me))
```

The control state part is defined as follows:

TABLE 26

```
structure GuardedUpdateControl implements CONTROLSTATE
    machine as GuardedUpdateMachine
    Accepting(ds as DATASTATE) as Boolean
        Satisfiable(ds.constr and machine.accept(ds)) =
            VERDICT.IsTrue
    Error(ds as DATASTATE) as Boolean
        Satisfiable(ds.constr and machine.error(ds)) <>
            VERDICT.IsFalse
    Steps(ds as DATASTATE)
        foreach r in machine.rules
            let r' = r.CloneWithFreshVariables( )
            let c' = ds.constr and r'.guard(ds)
            if Satisfiable(c') <> VERDICT.IsFalse
                let ds' = r'.Update(DATASTATE(ds.valuation,c'))
                yield MACHINESTATE(ds', me)
```

In this example, a state is allowed to be accepting only if the constraint associated with it can be proven to be true, whereas an error is flagged in every state where it cannot be proven to be false. These are both instances of over-approximation for an application of action machines in model-based testing and model-checking.

Concatenation (Sequential Composition)

An action machine resulting from the concatenation of two other action machines can be parameterized over the two machines it composes. For example:

TABLE 27

```
structure SequenceMachine implements MACHINE
    m1 as MACHINE
    m2 as MACHINE
```

In one embodiment, the machine uses one control state which embeds the first machine's behavior. When the machine transitions into the behavior of the second machine, it forgets the context of the sequential composition, as shown in Table 28:

TABLE 28 structure FirstInSequenceControl implements CONTROLSTATE
    m1Control as CONTROLSTATE
    m2    as MACHINE For its initial states, the machine resulting from concatenation should deal with the possibility that initial states of the first machine are accepting, allowing immediate transition into the second machine. Therefore, for an initial state of the first machine which is accepting, the initial states of the second machine can also be delivered (e.g., under the initial data state of the first machine's state):

TABLE 29 structure SequenceMachine
    GetInitialStates(ds as DATASTATE) as Stream of
    MACHINESTATE
        foreach ms1 in m1.GetInitialStates(ds)
            yield MACHINESTATE(ms1.data,
                FirstInSequenceControl(ms1.control,m2))
        if ms1.Accepting( )    // if this is an accepting state,
    also deliver
        // initial states of second machine
        foreach ms2 in m2.GetIntialStates(ms1.data)
            yield ms2

When stepping in the first machine, a step of the underlying machine can be simply propagated if the target state is not accepting. If the target state is accepting, then the step should be reproduced if the target state has outgoing steps; this step will keep the process in the first machine. Additionally, a step with the given action label to each of the initial states of the second machine can be produced; these steps represent the transitions to the behavior of the second machine, as shown in Table 30:

TABLE 30 structure FirstInSequenceControl
    Steps(ds as DATASTATE) as Stream of (TERM, MACHINESTATE)
        foreach (action, ms1) in m1Control.Steps(ds)
            if not ms1.Accepting( )
yield (action, FirstInSequenceControl(ms1.control. m2))
            else
                if ms1.Steps( ) <> [ ]
                    yield (action,
                      FirstInSequenceControl(ms1.control.m2))
                foreach ms2 in m2.GetInitialStates(ms1.data)
                    yield (action, ms2)

States of the first machine become non-accepting in the sequential composition. The machine resulting from the concatenation may transition from an accepting state of the first machine directly into an accepting state of the second machine; this can be captured either by an initial state of the second machine which has been delivered in GetInitialStates, or by a step into a state of the second machine in the Steps method. Errors can be passed on from the underlying machine as shown here:

TABLE 31 structure FirstInSequenceControl
    Accepting(ds as DATASTATE)
        false
    Error(ds as DATASTATE)
        innerControl.Error(ds)

Repetition (One-or-More Composition)

As explained above, the repetition operator can loop the behavior of a machine an arbitrary number of times. In one embodiment, the repetition machine (or "one-or-more" machine) is parameterized over this machine:

TABLE 32 structure OneOrMoreMachine implements MACHINE
    m as MACHINE

The initial states of the one-or-more machine, or those of the underlying machine, can include the control state of the one-or-more machine:

TABLE 33 structure OnOrMoreMachine
    GetInitialStates(ds as DATASTATE) as Stream of
    MACHINESTATE
        foreach ms in m.GetInitialStates(ds)
            yield MACHINESTATE(ms1.data,
            OneOrMoreControl(ms.control, m))

When stepping the one-or-more or machine, a step of the underlying machine can be propagated if the target state is not accepting. If the target state is accepting, then the step can be reproduced if the target state has outgoing steps; this step keeps the process in the current iteration. Additionally, steps can be produced with the given action label to the initial states of the looped machine; these steps represent the loop case:

TABLE 34 structure OneOrMoreControl implements CONTROLSTATE
    mControl as CONTROLSTATE
    m       as MACHINE
    Steps(ds as DATASTATE)
        foreach (action, ms) in mControl.Steps(ds)
            if not ms.Accepting( )
yield (action, OneOrMoreControl(ms.control, m))
            else
                if ms.Steps( ) <> [ ]
                    yield (action, OneOrMoreControl(ms.control, m))
                foreach ms' in m.GetInitialStates(ms.data)
                    yield (action, ms')

Accepting state and error conditions can be passed on from the underlying machine, as shown in Table 35:

TABLE 35 structure OneOrMoreControl
    Accepting(ds as DATASTATE)
        mControl.Accepting(ds)
    Error(ds as DATASTATE)
        mControl.Error(ds)

Choice

The choice machine may be defined by building the union the initial states of the composed machines. No special control state is required for this machine:

TABLE 36

```
structure ChoiceMachine implements MACHINE
    m1 as MACHINE
    m2 AS MACHINE
    GetInitialStates(ds as DATASTATE) as Stream of
    MACHINESTATE
        foreach ms1 in m1.GetInitialStates(ds)
            yield ms1
        foreach ms2 in m2.GetInitialStates(ds)
            yield ms2
```

Intersection and Interleaving (Parallel Composition)

Intersection and interleaving (parallel composition) are described in the exemplary implementation by the same machine. This machine is parameterized with a predicate which determines those actions on which the composed machines should synchronize (the intersection case) and on which they should not synchronize (the interleaving case). For example:

TABLE 37

```
structure ParallelMachine implements MACHINE
    m1 as MACHINE
    m2 as MACHINE
    syncOn as ACTIONPREDICATE
    delegate ACTIONPREDIACTE(action as Term) as Boolean
```

The initial states of this machine can be built from those initial states of the constituting machines for which the data states can be joined:

TABLE 38

```
structure ParallelMachine
    GetInitialStates(ds as DATASTATE) as Stream of
    MACHINESTATE
```

TABLE 38-continued

```
        foreach ms1 in m1.GetInitialStates(ds),
                ms2 in m2.GetInitialStates(ds),
                dsj = Join(ms1.data, Clone
                    WithFreshVariables(ms2.data))
                dsj <> undef
            yield MACHINESTATE(dsj, ParallelControl(me,
                    ms1.control,ms2.control))
```

The control state of this machine aggregates control states of the constituting machines. The enumeration step first enumerates the synchronized steps and then the non-synchronized steps. For synchronization, the following conditions should hold: (1) the actions of the inner steps are configured to be synchronized; (2) the target data states should have a join; and (3) equality on the actions should be satisfiable. For example:

TABLE 39

```
structure ParallelControl implements CONTROLSTATE
    machine as ParallelMachine
    innerControl1 as CONTROLSTATE
    innerControl2 as CONTROLSTATE
    Steps(ds as DATASTATE) as Stream of (TERM, MACHINESTATE)
        // enumerate common steps
        foreach (action1, ms1) in innerControl1.Steps(ds),
                (action2, ms2) in innerControl2.Steps(ds),
                // condition (1)
                machine.syncOn(action1), machine.syncOn(action2),
                // condition (2)
                (ds2', action2') = CloneWithFreshVariables(ms2.data, action2),
                dsj = Join(ms1.data, ds2'),
                dsj <> undef,
                // condition (3)
                Satisfiable(dsj.constr and action1 = action2') <> VERDICT.IsFalse
            yield (action1,
                MACHINESTATE(DATASTATE(dsj.valuation,
                        dsj.constr and action1 = action2'),
                    ParallelControl(machine,
                        ms1.control, ms2.control)))
        // enumerate interleaved steps
        foreach (action1, ms1) in innerControl1.Steps(ds),
                not machine.syncOn(action1)
            yield (action 1,
                MACHINESTATE(ms1.data,ParallelControl(machine,
                        ms1.control,innerControl2)))
        foreach (action2, ms2) in innerControl1.Steps(ds),
                not machine.syncOn(action2)
            yield (action2,
                MACHINESTATE(ms2.data,ParallelControl(machine,
                        innerControl1,ms2.control)))
```

The accepting state and the error state properties can be inherited from the inner machines, as shown below in Table 40:

TABLE 40

```
structure ParallelControl
    Accepting(ds as DATASTATE) as Boolean
        innerControl1.Accepting(ds) and innerControl2.Accepting(ds)
    Error(ds as DATASTATE) as Boolean
        innerControl1.Error(ds) or innerControl2.Error(ds)
```

Conformance Machine (Alternating Simulation)

As explained above, in defining alternating simulation, action labels are partitioned into "controllable" and "observable" actions. The conformance machine can be parameterized by a predicate which describes this partitioning, and the two machines it composes. For example:

TABLE 41

```
structure AlternatingSimulationMachine implements MACHINE
    isObservable as ACTIONPREDICATE
    m1      as MACHINE
    m2      as MACHINE
```

The initial states of this machine can be constructed similarly to initial states for the parallel machine: those state combinations which can be joined are used as initial states. However, if there are no possible states that can be joined, this may be considered an error. For example:

TABLE 42

```
structure AlternatingSimulationMachine
    GetInitialStates(ds as DATASTATE) as Stream of
    MACHINESTATE
        var hasJoins = false
        foreach ms1 in m1.GetInitialStates(ds),
            ms2 in m2.GetInitialStates(ds),
            dsj =
                Join(ms1.data,CloneWithFreshVariables(ms2.data))
            dsj <> undef
            hasJoins := true
            yield MACHINESTATE(dsj,
                AlternatingControl(me,
                    ms1.control,ms2.control))
        if not hasJoins
            yield MACHINESTATE(ds, AlternatingError)
```

In this embodiment, the control stepping works as follows. The second machine must simulate all control steps of the first machine, and the first machine simulates observation steps of the second machine:

TABLE 43

```
structure AlternatingControl implements CONTROLSTATE
    machine as AlternatingSimulationMachine
    innerControl1 as CONTROLSTATE
    innerControl2 as CONTROLSTATE
    Steps(ds as DATASTATE) as Stream of (TERM, MACHINESTATE)
        Simulate(ds, false, innerControl1, innerControl2)
        Simulate(ds, true, innerControl2, innerControl1)
```

In the present embodiment, simulation is defined as follows. For steps in the master machine, there is at least one step in the slave machine which can simulate the master's step. Simulation is thereby defined as follows: (1) the target states of master and slave must have a join; (2) the equality of the actions of master and slave cannot be proven to be unsatisfiable; and (3) the data state resulting from the join and the unification of the actions subsumes the data state of the master; i.e., the slave is not allowed to specialize the joined states of master and slave. The simulating steps are yielded. If no such step exists, a step which leads into an error state is produced:

TABLE 44

```
structure AlternatingControl
    Simulate(ds as DATASTATE, observe as Boolean,
            master as CONTROLSTATE, slave as CONTROLSTATE)
        foreach (action1, ms1) in master.Steps(ds),
                    machine.isObservable(action1) = observe
            var canSimulate = false
            foreach
                (action2, ms2) in slave.Steps(ds),
                // condition (1)
                (ds2', action2') = CloneWithFreshVariables(ms2.data, action2)
                dsj = Join(ms1.data, ds2')
                dsj <> undef,
                // condition (2)
                Satisfiable(dsj.constr and action1 = action2') <> VERDICT.IsFalse,
                dsj' = DATASTATE(dsj.valuation, dsj.constr and action1 = action2')
                // condition (3)
                Subsumes(dsj, CloneWithFreshVariables(ms1.data))
                canSimulate := true
                yield (action1,
                        MACHINESTATE(dsj', AlternatingControl(machine,ms1.control,
                            ms2.control)))
            if not canSimulate
                // no step of slave can simulate masters step
                yield (action1, MACHINESTATE(ms1.data, AlternatingError))
```

Accepting state and error conditions can be propagated for the alternating control state, similar to the parallel control state:

TABLE 45

```
structure AlternatingControl
    Accepting(ds as DATASTATE) as Boolean
        innerControl1.Accepting(ds) and innerControl2.Accepting(ds)
    Error(ds as DATASTATE) as Boolean
        innerControl1.Error(ds) or innerControl2.Error(ds)
```

The control state which represents an error discovered in alternating simulation can be defined as shown in Table 46:

TABLE 46

```
structure AlternatingError
    Steps(ds as DATASTATE) as Stream of (TERM, MACHINESTATE)
        skip
    Accepting(ds as DATASTATE) as Boolean true
    Error(ds as DATASTATE) as Boolean true
```

Exemplary System for Testing Programs

Figure 6:
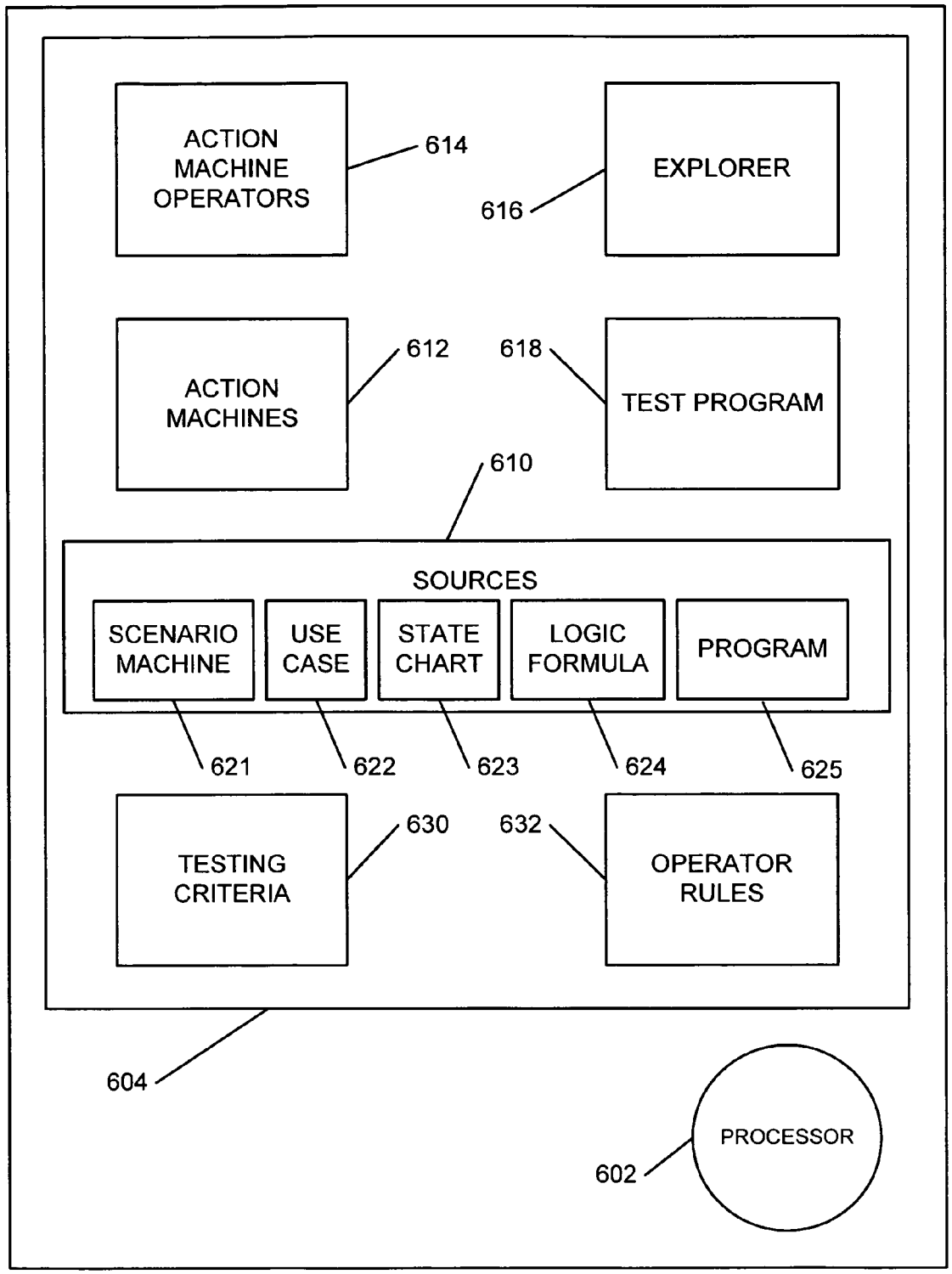
FIG. 6 depicts a block diagram of an exemplary system for testing programs.

FIG. 6 depicts a block diagram of an exemplary system for testing programs. The system 600 comprises a digital processor 602 and a digital memory 604. The memory 604 comprises several computer-readable resources, including one or more sources 610 for creating action machines, one or more action machines 612, one or more action machine operators 614, one or more explorers 616, and one or more test programs 618.

In one example, action machines 612 are created from sources 610 (e.g., scenario machine 621, use case 622, state chart 623, temporal logic formula 624, or program 625). The action machines 612 are modified using one or more operators 614 to create one or more additional action machines, for example, one that isolates a particular feature of a program. The operators 614 may be governed by operator rules 632. The additional action machine or machines are examined using the explorer 616 in conjunction with the test program 618, allowing a user observe the functioning of various states of the additional machine and possibly produce testing criteria 630. Additionally, the system may include a video rendering and display system (not shown) to graphically render various aspects of the action machines visually. The user may also modify elements of the system 600 using the display system.

Exemplary Computing Environment

Figure 7:
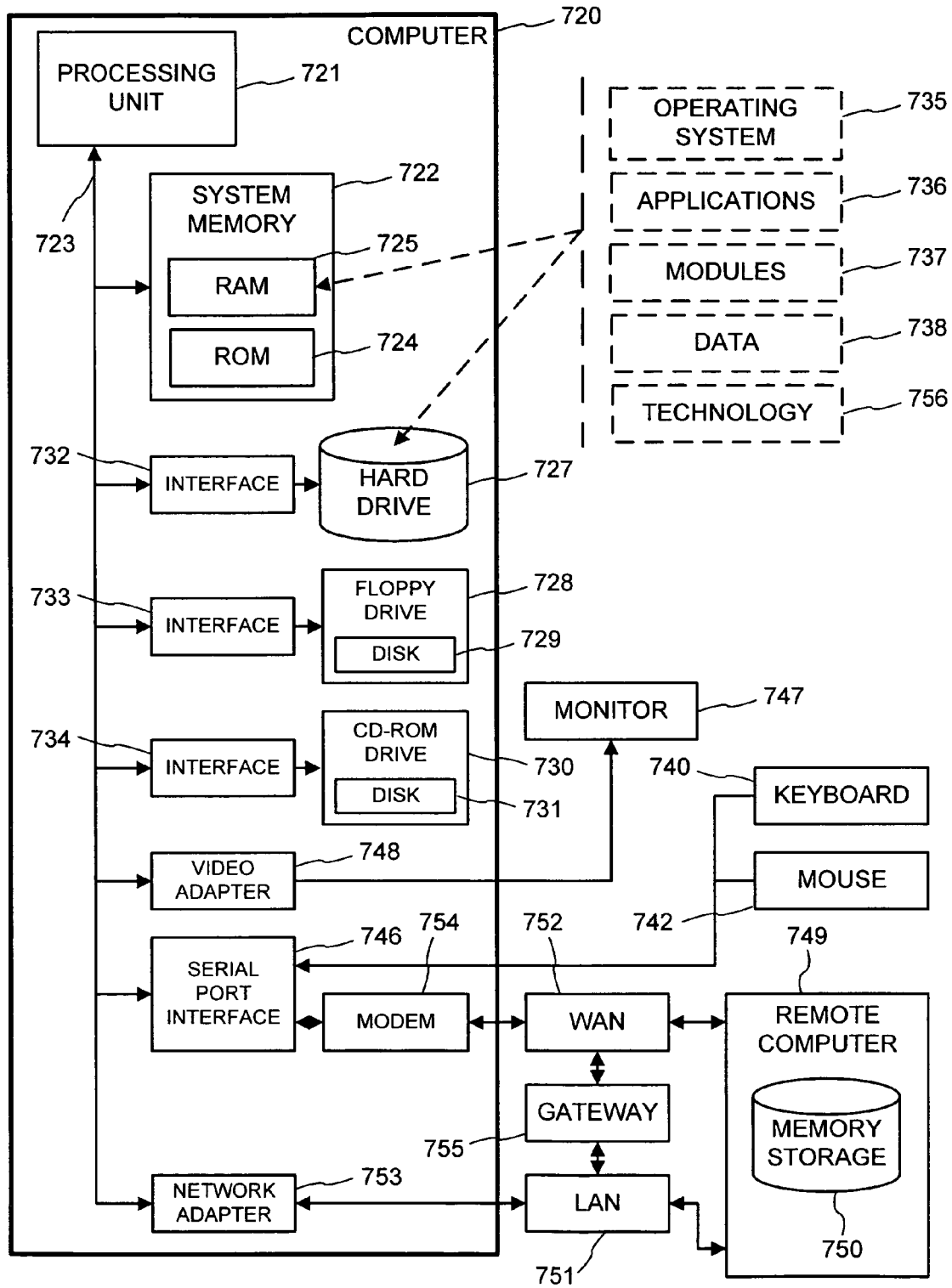
FIG. 7 depicts a block diagram of a distributed computer system.

FIG. 7 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc., that perform particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 7, an exemplary system for implementation includes a conventional computer 720 (such as personal computers, laptops, servers, mainframes, and other variety computers) includes a processing unit 721, a system memory 722, and a system bus 723 that couples various system components including the system memory to the processing unit 721. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 721.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 724 and random access memory (RAM) 725. A basic input/output system (BIOS), containing the basic routines that help to transfer information between elements within the computer 720, such as during start-up, is stored in ROM 724.

The computer 720 further includes a hard disk drive 727, a magnetic disk drive 728, e.g., to read from or write to a removable disk 729, and an optical disk drive 730, e.g., for reading a CD-ROM disk 731 or to read from or write to other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of data, data structures, computer-executable instructions, etc., for the computer 720. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 725, including an operating system 735, one or more application programs 736, other program modules 737, and program data 738; in addition to an implementation of the described symbolic program model compositions 756.

A user may enter commands and information into the computer 720 through a keyboard 740 and pointing device, such as a mouse 742. These and other input devices are often connected to the processing unit 721 through a serial port interface 746 that is coupled to the system bus, but may be connected by other interfaces, such as a parallel port, game port or a universal serial bus (USB). A monitor 747 or other type of display device is also connected to the system bus 723 via an interface, such as a video adapter 748. In addition to the monitor, computers typically include other peripheral output devices (not shown), such as speakers and printers.

The computer 720 operates in a networked environment using logical connections to one or more remote computers, such as a remote computer 749. The remote computer 749 may be a server, a router, a peer device or other common network node, and typically includes many or all of the elements described relative to the computer 720, although only a memory storage device 750 has been illustrated. The logical connections depicted include a local area network (LAN) 751 and a wide area network (WAN) 752. Such networking environments are commonplace in offices, enterprise-wide computer networks, intranets and the Internet.

When used in a LAN networking environment, the computer 720 is connected to the local network 751 through a network interface or adapter 753. When used in a WAN networking environment, the computer 720 typically includes a modem 754 or other means for establishing communications (e.g., via the LAN 751 and a gateway or proxy server 755) over the wide area network 752, such as the Internet. The modem 754, which may be internal or external, is connected to the system bus 723 via the serial port interface 746. In a networked environment, program modules depicted relative to the computer 720, or portions thereof, may be stored in the remote memory storage device. It will be appreciated that the network connections shown are exemplary and other means of establishing a communications link between the computing devices may be used, wireless or otherwise.

ALTERNATIVES

Having described and illustrated the principles of this technology with reference to illustrated examples, it will be recognized that the examples can be modified in arrangement and detail without departing from such principles. Additionally, as will be apparent to ordinary computer scientists, portions of the examples or complete examples can be combined with other portions of other examples in whole or in part. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. Techniques from one example can be incorporated into any of the other examples.

In view of the many possible embodiments to which the principles of these features may be applied, it should be recognized that the details are illustrative only and should not be taken as limiting the scope of the claims. Rather, we claim as our invention all such embodiments as may come within the scope and spirit of the following claims and equivalents thereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method of creating a software program model, the method comprising:
    defining a first symbolic program model;
    defining a second symbolic program model;
    defining a symbolic model operator;
    combining the first symbolic program model with the second symbolic program model according to a set of rules of the symbolic model operator and properties of the second symbolic program model to produce the software program model comprising one or more states; and
    observing properties of the software program model using a test program and a symbolic explorer that prunes exploration of the software program model based on state subsumption.

2. The computer-implemented method of claim 1, wherein the first symbolic program model comprises a first set of symbolic states associated with a first set of actions, and wherein the second symbolic program model comprises a second set of symbolic states associated with a second set of actions.

3. The computer-implemented method of claim 2, wherein the software program model comprises a subset of the first set of symbolic states and the first set of actions.

4. The computer-implemented method of claim 1, wherein the first or second symbolic program model is derived from a scenario machine, a use case, a state chart, a temporal logic formula, or an actual program.

5. The computer-implemented method of claim 1, wherein the first symbolic program model comprises an accepting state, wherein the second program model comprises an initial state, and wherein combining the first model with the second model comprises merging the accepting state of the first model with the initial state of the second model.

6. The computer-implemented method of claim 1, wherein a behavior of the software program model is related to a control variable, wherein the behavior exhibits a first aspect derived from the first symbolic program model if the control variable has a first value, and wherein the behavior exhibits a second aspect derived from the second symbolic program model if the control variable has a second value.

7. The computer-implemented method of claim 1, further comprising generating a set of testing criteria based on the software program model.

8. A computer-readable medium containing instructions which can cause a computer to perform a method, the method comprising:
    defining a symbolic program model;
    defining a symbolic scenario model;
    defining a symbolic model operator; and
    modifying the symbolic program model according to properties of the symbolic model operator and according to properties of the symbolic scenario model producing a software program model comprising one or more states;
    wherein the one or more states of the software program model are examined using a test program in conjunction with a symbolic explorer that prunes a search of the software program model based on state subsumption.

9. The computer-readable medium of claim 8, wherein the symbolic model operator's properties cause the symbolic program model to be translated according to a set of translation rules.

10. The computer-readable medium of claim 8, wherein the symbolic model operator's properties cause the symbolic program model to be repeated one or more times upon execution of the program model.

11. The computer-readable medium of claim 8, further comprising observing properties of the software program model using a symbolic explorer.

12. The computer-readable medium of claim 11, wherein the symbolic explorer uses state subsumption.

13. A system for testing programs comprising:
    a digital processor; and
    a digital memory, the memory comprising:
        a symbolic program model;
        a symbolic scenario model;
        a symbolic model operator, wherein the processor is configured to modify the symbolic program model according to one or more properties of the symbolic model operator and according to one or more properties of the symbolic scenario model to produce a software program model with one or more states;
        a test program;
        an explorer that prunes a search of the software program model based on state subsumption, wherein the test program is configured to examine the one or more states of the software program model in conjunction with the explorer; and
        a program model source, wherein the symbolic program model is derived from the program model source.

14. The system of claim 13, further comprising a video rendering system configured to display one or more aspects of the symbolic program model or symbolic model operator.

* * * * *